(12) United States Patent
Rokitski et al.

(10) Patent No.: US 12,444,901 B2
(45) Date of Patent: Oct. 14, 2025

(54) SEED LASER SYSTEM FOR RADIATION SOURCE

(71) Applicant: ASML Netherlands B.V., Veldhoven (NL)

(72) Inventors: Rostislav Rokitski, San Diego, CA (US); Philip M. Conklin, San Diego, CA (US); Cory Alan Stinson, San Diego, CA (US); Alexander Anthony Schafgans, San Diego, CA (US); Christoffel Johannes Liebenberg, San Marcos, CA (US)

(73) Assignee: ASML Netherlands B.V., Veldhoven (NL)

( * ) Notice: Subject to any disclaimer, the term of this patent is extended or adjusted under 35 U.S.C. 154(b) by 537 days.

(21) Appl. No.: 17/913,013

(22) PCT Filed: Mar. 10, 2021

(86) PCT No.: PCT/EP2021/055958
§ 371 (c)(1),
(2) Date: Sep. 20, 2022

(87) PCT Pub. No.: WO2021/204481
PCT Pub. Date: Oct. 14, 2021

(65) Prior Publication Data
US 2023/0143962 A1    May 11, 2023

Related U.S. Application Data

(60) Provisional application No. 63/007,759, filed on Apr. 9, 2020.

(51) Int. Cl.
*H01S 3/23* (2006.01)
*H01S 3/00* (2006.01)
*H01S 3/10* (2006.01)

(52) U.S. Cl.
CPC .......... *H01S 3/2333* (2013.01); *H01S 3/0085* (2013.01); *H01S 3/1003* (2013.01); *H01S 3/10061* (2013.01); *H01S 3/2391* (2013.01)

(58) Field of Classification Search
CPC .... H01S 3/2333; H01S 3/2308; H01S 3/2325; H01S 3/2391
See application file for complete search history.

(56) References Cited

U.S. PATENT DOCUMENTS 6,952,253 B2  10/2005  Lof et al.
7,491,954 B2   2/2009  Bykanov et al.
(Continued)

FOREIGN PATENT DOCUMENTS

TW   200931745 A   7/2009
TW   201352073 A  12/2013
(Continued)

OTHER PUBLICATIONS

Denis Herve, European International Searching Authority, International Search Report and Written Opinion, counterpart PCT Application No. PCT/EP2021/055958, mailed Jun. 22, 2021, 11 pages total.

(Continued)

*Primary Examiner* — James A Menefee
(74) *Attorney, Agent, or Firm* — DiBerardino McGovern IP Group LLC

(57) ABSTRACT

Systems, apparatuses, and methods are provided for dual-pass amplification of laser beams along a common beam path. An example method can include generating a first laser beam and a second laser beam. Subsequently, the example method can include performing dual-pass amplification of the first laser beam and the second laser beam along a common beam path. In some aspects, the first laser beam can (Continued)

include a first wavelength, the second laser beam can include a second wavelength different from the first wavelength.

18 Claims, 10 Drawing Sheets

(56) References Cited

U.S. PATENT DOCUMENTS

| | | | |
|---|---|---|---|
| 7,511,799 | B2 | 3/2009 | Tel et al. |
| 8,017,924 | B2 | 9/2011 | Bykanov et al. |
| 8,680,495 | B1 | 3/2014 | Tao et al. |
| 9,000,405 | B2 | 4/2015 | Fleurov et al. |
| 10,667,377 | B2 | 5/2020 | Rafac et al. |
| 12,174,550 | B2 | 12/2024 | Riggs et al. |
| 2006/0192152 | A1 | 8/2006 | Ershov et al. |
| 2009/0161201 | A1 | 6/2009 | Ershov et al. |
| 2010/0040105 | A1 | 2/2010 | Rocca et al. |
| 2013/0321901 | A1 | 12/2013 | Ershov et al. |
| 2013/0321926 | A1 | 12/2013 | Bergstedt et al. |
| 2014/0211184 | A1* | 7/2014 | Wagner ............... H05G 2/0082 250/503.1 |
| 2014/0264087 | A1 | 9/2014 | Rafac et al. |
| 2015/0250045 | A1 | 9/2015 | Tao et al. |
| 2016/0165709 | A1 | 6/2016 | Tao et al. |
| 2017/0099721 | A1* | 4/2017 | Tao ...................... H01S 3/2391 |
| 2017/0181259 | A1 | 6/2017 | Nogiwa |
| 2018/0031979 | A1* | 2/2018 | Bleeker ............... G02B 27/141 |
| 2018/0081280 | A1* | 3/2018 | Schafgans ........... H01S 3/0078 |
| 2018/0136541 | A1 | 5/2018 | Rafac |
| 2018/0246338 | A1* | 8/2018 | Stinson .............. G02B 27/4261 |
| 2018/0279459 | A1* | 9/2018 | Wissert ................. H01S 3/005 |
| 2018/0317308 | A1 | 11/2018 | Chang et al. |

FOREIGN PATENT DOCUMENTS

| | | |
|---|---|---|
| TW | 201631361 A | 9/2016 |
| TW | 201830159 A | 8/2018 |
| WO | 2017059314 A1 | 4/2017 |
| WO | 2019192841 A1 | 10/2019 |
| WO | 2020178244 A1 | 9/2020 |
| WO | 2021108054 A1 | 6/2021 |

OTHER PUBLICATIONS

"Multipass Power Amplifier Configuration," Prior Art Disclosure, Publication ID A20230810, Issue #645, ISSN: 2198-4786, pp. 13-15 (Sep. 20, 2023).

"Research Disclosure," Research Disclosure, Questel Ireland Ltd, Killernan, Ireland, Database No. 715043, Oct. 3, 2023 (www.researchdisclosure.com).

"System and Method for Compensating Plasma Pressure on Tin Droplets Using a Nonlinear Model," Research Disclosure, Questel Ireland Ltd, Killernan, Ireland, Database No. 730036, Jan. 7, 2025 (www.researchdisclosure.com).

"Control of Conversion Efficiency in an EUV Source," Research Disclosure, Questel Ireland Ltd, Killernan, Ireland, Database No. 730037, Jan. 7, 2025 (www.researchdisclosure.com).

"System and Method for Optimizing Target Expansion for Enhancing EUV Radiation From a Laser-Produced Plasma," Research Disclosure, Questel Ireland Ltd, Killernan, Ireland, Database No. 730059, Jan. 13, 2025 (www.researchdisclosure.com).

"System and Method for Optimizing Target Rarefaction for Enhancing EUV Radiation From a Laser-Produced Plasma," Research Disclosure, Questel Ireland Ltd, Killernan, Ireland, Database No. 730060, Jan. 13, 2025 (www.researchdisclosure.com).

* cited by examiner

SEED LASER SYSTEM FOR RADIATION SOURCE

CROSS REFERENCE TO RELATED APPLICATIONS

This application claims priority to U.S. Application No. 63/007,759, filed Apr. 9, 2020 and titled SEED LASER SYSTEM FOR RADIATION SOURCE, and which is incorporated herein in its entirety by reference.

TECHNICAL FIELD

The present disclosure relates to a laser source for use in, for example, lithographic apparatuses and systems.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is interchangeably referred to as a mask or a reticle, can be used to generate a circuit pattern to be formed on an individual layer of the IC being formed. This pattern can be transferred onto a target portion (e.g., including part of, one, or several dies) on a substrate (e.g., a silicon wafer). Transfer of the pattern is typically via imaging onto a layer of radiation-sensitive material (e.g., resist) provided on the substrate. In general, a single substrate will contain a network of adjacent target portions that are successively patterned. Traditional lithographic apparatuses include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the target portions parallel or anti-parallel (e.g., opposite) to this scanning direction. It is also possible to transfer the pattern from the patterning device to the substrate by imprinting the pattern onto the substrate.

As semiconductor manufacturing processes continue to advance, the dimensions of circuit elements have continually been reduced while the amount of functional elements, such as transistors, per device has been steadily increasing over decades, following a trend commonly referred to as Moore's law. To keep up with Moore's law the semiconductor industry is chasing technologies that enable to create increasingly smaller features. To project a pattern on a substrate a lithographic apparatus may use electromagnetic radiation. The wavelength of this radiation determines the minimum size of features which are patterned on the substrate. Typical wavelengths currently in use are 365 nanometers (nm) (i-line), 248 nm, 193 nm and 13.5 nm.

Extreme ultraviolet (EUV) radiation, for example, electromagnetic radiation having wavelengths of around 50 nm or less (also sometimes referred to as soft x-rays), and including light at a wavelength of about 13.5 nm, can be used in or with a lithographic apparatus to produce extremely small features in or on substrates, for example, silicon wafers. A lithographic apparatus which uses EUV radiation having a wavelength within a range of 4 nm to 20 nm, for example 6.7 nm or 13.5 nm, can be used to form smaller features on a substrate than a lithographic apparatus which uses, for example, radiation with a wavelength of 193 nm.

Methods to produce EUV light include, but are not necessarily limited to, converting a material that has an element, for example, xenon (Xe), lithium (Li), or tin (Sn), with an emission line in the EUV range to a plasma state. For example, in one such method called laser produced plasma (LPP), the plasma can be produced by irradiating a target material, which is interchangeably referred to as fuel in the context of LPP sources, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

The present disclosure describes various aspects of systems, apparatuses, and methods for dual-pass amplification of different laser beams along a common beam path in, for example, a carbon dioxide ($CO_2$) seed laser system for an EUV radiation source. In some aspects, the present disclosure provides for performing dual-pass amplification of laser beams, each having a different wavelength, along a common beam path. In some aspects, each laser beam's wavelength and the respective radio frequency characteristics of acousto-optic modulators disposed along each laser beam's path can be matched to provide for multiple-wavelength acousto-optic modulation along the common beam path.

In some aspects, the present disclosure describes a radiation source. The radiation source can include a laser system. The laser system can include a first laser source configured to generate a first laser beam. The laser system can further include a second laser source configured to generate a second laser beam. The laser system can further include a dual-pass amplifier configured to perform dual-pass amplification of the first laser beam along a common beam path. The dual-pass amplifier can be further configured to perform dual-pass amplification of the second laser beam along the common beam path.

In some aspects, the first laser beam can include a pre-pulse laser beam. In some aspects, the second laser beam can include a main pulse laser beam. In some aspects, the laser system can be configured to hit a fuel target with the pre-pulse laser beam to generate a modified fuel target. In some aspects, the laser system can be further configured to hit the modified fuel target with the main pulse laser beam to generate a plasma at a plasma formation region.

In some aspects, the first laser beam can include a first wavelength. In some aspects, the second laser beam can include a second wavelength different from the first wavelength. In some aspects, the second wavelength can be greater than about the first wavelength.

In some aspects, the laser system can further include a laser controller. In some aspects, the laser controller can be configured to determine the first wavelength based on the second wavelength. In other aspects, the laser controller can be configured to determine the second wavelength based on the first wavelength.

In some aspects, the laser system can further include an electro-optic modulator disposed between the second laser source and the dual-pass amplifier. In some aspects, the electro-optic modulator can be configured to output the first laser beam along the common beam path. In some aspects, the electro-optic modulator can be further configured to output the second laser beam along the common beam path. In some aspects, the electro-optic modulator can include a first single-crystal electro-optic modulator, a second single-crystal electro-optic modulator, and a third single-crystal electro-optic modulator. In some aspects, the electro-optic modulator can include a single-crystal electro-optic modulator and a double-crystal electro-optic modulator. In some aspects, the electro-optic modulator can include a triple-crystal electro-optic modulator. In some aspects, the laser system can further include an acousto-optic modulator disposed along the common beam path between the electro-optic modulator and the dual-pass amplifier. In some aspects, the acousto-optic modulator can be configured to receive the first laser beam from the electro-optic modulator along the common beam path. In some aspects, the acousto-optic modulator can be further configured to receive the second laser beam from the electro-optic modulator along the common beam path. In some aspects, the acousto-optic modulator can be further configured to output the first laser beam to the dual-pass amplifier along the common beam path. In some aspects, the acousto-optic modulator can be further configured to output the second laser beam to the dual-pass amplifier along the common beam path. In some aspects, the acousto-optic modulator can be further configured to output the first laser beam at a first diffraction angle. In some aspects, the acousto-optic modulator can be further configured to output the second laser beam at a second diffraction angle. In some aspects, the second diffraction angle can be about equal to the first diffraction angle. In some aspects, the acousto-optic modulator can be further configured to generate, based on a first radio frequency of a first radio wave, a first acoustic grating configured to diffract the first laser beam. In some aspects, the acousto-optic modulator can be further configured to generate, based on a second radio frequency of a second radio wave, a second acoustic grating configured to diffract the second laser beam. In some aspects, a first mathematical product of the first wavelength and the first radio frequency is about equal to a second mathematical product of the second wavelength and the second radio frequency.

In some aspects, the laser system can further include an acousto-optic modulator disposed along the common beam path. In some aspects, the acousto-optic modulator can be configured to receive the first laser beam from the dual-pass amplifier along the common beam path. In some aspects, the acousto-optic modulator can be further configured to receive the second laser beam from the dual-pass amplifier along the common beam path. In some aspects, the acousto-optic modulator can be further configured to generate a modified first laser beam based on a first wavelength of the first laser beam. In some aspects, the acousto-optic modulator can be further configured to generate a modified second laser beam based on a second wavelength of the second laser beam. In some aspects, the acousto-optic modulator can be further configured to output the modified first laser beam to the dual-pass amplifier along the common beam path. In some aspects, the acousto-optic modulator can be further configured to output the modified second laser beam to the dual-pass amplifier along the common beam path. In some aspects, the acousto-optic modulator can be further configured to generate, based on a first radio frequency of a first radio wave, a first acoustic grating configured to diffract the first laser beam. In some aspects, the acousto-optic modulator can be further configured to generate, based on a second radio frequency of a second radio wave, a second acoustic grating configured to diffract the second laser beam. In some aspects, the acousto-optic modulator can be further configured to output, based on the first acoustic grating, the first laser beam at a first diffraction angle. In some aspects, the acousto-optic modulator can be further configured to output, based on the second acoustic grating, the second laser beam at a second diffraction angle. In some aspects, a first mathematical product of the first wavelength and the first radio frequency can be about equal to a second mathematical product of the second wavelength and the second radio frequency. In some aspects, the second diffraction angle can be about equal to the first diffraction angle. In some aspects, the dual-pass amplifier can be further configured to perform dual-pass amplification of the first laser beam based on a first amplification of the first laser beam and a second amplification of the modified first laser beam. In some aspects, the dual-pass amplifier can be further configured to perform dual-pass amplification of the second laser beam based on a third amplification of the second laser beam and a fourth amplification of the modified second laser beam.

In some aspects, the laser system can further include a laser isolation system disposed downstream of the dual-pass amplifier along the common beam path. In some aspects, the laser isolation system can be configured to receive a dual-pass amplified first laser beam from the dual-pass amplifier along the common beam path. In some aspects, the laser isolation system can be further configured to receive a dual-pass amplified second laser beam from the dual-pass amplifier along the common beam path. In some aspects, the laser isolation system can be further configured to generate an isolated first laser beam based on the dual-pass amplified first laser beam. In some aspects, the laser isolation system can be further configured to generate an isolated second laser beam based on the dual-pass amplified second laser beam. In some aspects, the isolated first laser beam can include a first isolation factor of greater than 10,000 times. In some aspects, the isolated second laser beam can include a second isolation factor of greater than 10,000 times.

In some aspects, the laser isolation system can include a first acousto-optic modulator disposed downstream of the dual-pass amplifier along the common beam path. Optionally, in some aspects, the laser isolation system can further include a second acousto-optic modulator disposed downstream of the first acousto-optic modulator along the common beam path.

In some aspects, the present disclosure describes an apparatus. The apparatus can include a first laser source configured to generate a first laser beam that includes a first wavelength. The apparatus can further include a second laser source configured to generate a second laser beam that includes a second wavelength. The apparatus can further include a dual-pass amplifier configured to perform dual-pass amplification of the first laser beam along a common beam path. The dual-pass amplifier can be further configured to perform dual-pass amplification of the second laser beam along the common beam path.

In some aspects, the present disclosure describes a method for dual-pass amplification of two different laser beams along a common beam path. The method can include generating, by a first laser source, a first laser beam having a first wavelength. The method can further include generating, by a second laser source, a second laser beam having a second wavelength. The method can further include performing, by a dual-pass amplifier, dual-pass amplification of the first laser beam along a common beam path. The method can further include performing, by the dual-pass amplifier, dual-pass amplification of the second laser beam along the common beam path.

Further features and advantages, as well as the structure and operation of various aspects, are described in detail below with reference to the accompanying drawings. It is noted that the disclosure is not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form part of the specification, illustrate the present disclosure and, together with the description, further serve to explain the principles of the aspects of this disclosure and to enable a person skilled in the relevant art(s) to make and use the aspects of this disclosure.

Figure 1A:
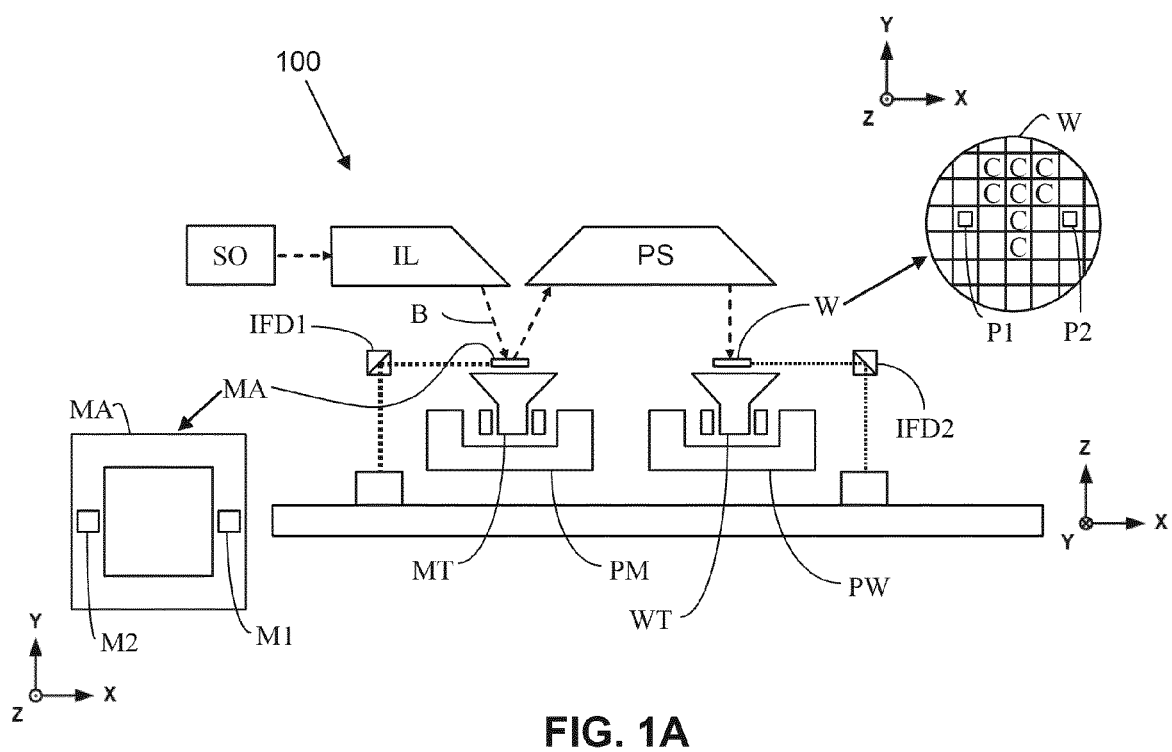
FIG. 1A is a schematic illustration of an example reflective lithographic apparatus according to some aspects of the present disclosure.

The features and advantages of the present disclosure will become more apparent from the detailed description set forth below when taken in conjunction with the drawings, in which like reference characters identify corresponding elements throughout. In the drawings, unless otherwise indicated, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) merely describe the present disclosure. The scope of the disclosure is not limited to the disclosed embodiment(s). The breadth and scope of the disclosure are defined by the claims appended hereto and their equivalents.

The embodiment(s) described, and references in the specification to "one embodiment," "an embodiment," "an example embodiment," etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein may likewise be interpreted accordingly.

The term "about" as used herein indicates the value of a given quantity that can vary based on a particular technology. Based on the particular technology, the term "about" can indicate a value of a given quantity that varies within, for example, 10-30% of the value (e.g., ±10%, ±20%, or ±30% of the value).

Overview

In one example, a CO2 seed laser system for an EUV light source can include a high power seed system (HPSS) having a high power seed module (HPSM). The HPSM can include a CO2 pre-pulse seed source, a CO2 main pulse seed source, and an amplifier. The CO2 pre-pulse seed source emits a pre-pulse beam that traverses the amplifier along a pre-pulse beam path. The CO2 main pulse seed source emits a main pulse beam that traverses the amplifier along a main pulse beam path that is different from the pre-pulse beam path. The pre-pulse beam path can progress from the CO2 pre-pulse seed source to a first electro-optic modulator (EOM), a first acousto-optic modulator (AOM), a second AOM, a delay line, the amplifier (e.g., a first pass through the amplifier), a third AOM, and finally a fourth AOM before being output. The main pulse beam path can progress from the CO2 main pulse seed source to a second EOM, a fifth AOM, a sixth AOM, the amplifier (e.g., a first pass through the amplifier), a seventh AOM, a delay line, another delay line, an eighth AOM, the amplifier (e.g., a second pass through the amplifier), and a ninth AOM before being output. In short, the HPSM architecture uses different EOMs and AOMs for the pre-pulse and main pulse beams, increasing the optical, mechanical, and control complexity of the CO2 seed laser system. As a further result of the multiple components necessitated by the two beam paths, the HPSM can have a high cost, long time to repair, insufficient margin on pre-pulse energy, insufficient pre-pulse pedestal performance, and insufficient product expected life. In addition, the pre-pulse beam only passes once through the amplifier, while the main pulse beam passes twice through the amplifier. Thus, this HPSM architecture implements dual-pass amplification only for the main pulse beam.

In contrast, some aspects of the present disclosure provide for a laser system (e.g., a CO2 seed laser system for an EUV radiation source) that provides for dual-pass amplification of both the pre-pulse laser beam and the main pulse laser beam using a common pre-pulse and main pulse beam path, referred to herein as a "common beam path," for both the pre-pulse and main pulse laser beams. In some aspects, the laser system disclosed herein can include a first laser source (e.g., a CO2 pre-pulse laser source), a second laser source (e.g., a CO2 main pulse laser source), and a dual-pass amplifier. The first laser source emits a first laser beam (e.g., pre-pulse laser beam) that traverses the dual-pass amplifier along a common beam path. The second laser source emits a second laser beam (e.g., a main pulse laser beam) that traverses the dual-pass amplifier along the common beam path. The common beam path can progress from the first and second laser sources to an EOM (e.g., a triple-crystal EOM), a first AOM, the dual-pass amplifier (e.g., a first pass through the dual-pass amplifier), a second AOM (and in some instances a polarization rotator), the dual-pass amplifier (e.g., a second pass through the dual-pass amplifier), a third AOM, and a fourth AOM before being output. In some aspects, the laser system disclosed herein utilizes EOMs for pulse shaping and AOMs for optical isolation.

In some aspects, the present disclosure provides for dual-pass amplification of multiple laser beams using a common beam path. For example, some aspects of the present disclosure can provide for generating a first laser beam having a first wavelength, and generating a second laser beam having a second wavelength different from the first wavelength. In another example, some aspects of the present disclosure can provide for dual-pass amplification of the first laser beam and the second laser beam along a common beam path.

In some aspects, the common pre-pulse and main pulse beam path disclosed herein leads to pre-pulse and main pulse laser beam properties reacting the same way to common mechanical and thermal disturbances, which may lead to more stable system performance, substantially eliminating differential pre-pulse and main pulse disturbances and the need for pre-pulse and main pulse differential compensators.

In some aspects, the laser system disclosed herein includes a triple-triggered EOM (e.g., a triple-crystal EOM; a single-crystal EOM and a double-crystal EOM; three single-crystal EOMs) disposed near the beginning of the combined beam path that provides a flexible architecture for main pulse "natural" and "fast" pedestal control, while reducing the pre-pulse pedestal (e.g., the undesired pedestal in the pre-pulse laser beam). In some aspects, the laser system disclosed herein applies multiple triggers to the EOM crystals within the same fuel target interval (e.g., tin droplet interval).

In some aspects, the laser system disclosed herein includes AOMs that can also be used for isolation and power flow control. In some aspects, the laser system disclosed herein reduces the gate times for all AOMs to between about 500 nanoseconds (ns) and 1,000 ns, resulting in isolation and self-lasing robustness.

There are many exemplary aspects to the systems, apparatuses, methods, and computer program products disclosed herein. For example, aspects of the present disclosure provide for dual-use of electro-optic and acousto-optic modulators to provide a common beam path for the pre-pulse and main pulse laser beams, thereby simplifying the laser system (e.g., up to two-time reduction in complexity). In some aspects, the laser system disclosed herein is further simplified based on utilization of time-dependent gain, glint, and isolation in the laser system. In some aspects, the simplification of the laser system disclosed herein leads to a reduction in cost (e.g., by 25 percent), a reduction in mean time to repair (e.g., from 30-40 hours to about 10 hours), smaller size (e.g., smaller volume, smaller footprint, or both), an increase in system availability, increased margin on pre-pulse energy (e.g., a three-fold increase, providing for system operation at high repetition rates), increased pre-pulse pedestal performance, increased pre-pulse amplification (e.g., the laser system implements dual-pass amplification for both the pre-pulse and main pulse laser beams), reduced differential pre-pulse and main pulse disturbances, elimination of the need for pre-pulse and main pulse differential compensators, and increased product expected life.

Before describing such aspects in more detail, however, it is instructive to present an example environment in which aspects of the present disclosure can be implemented.

Example Lithographic Systems

Figure 1B:
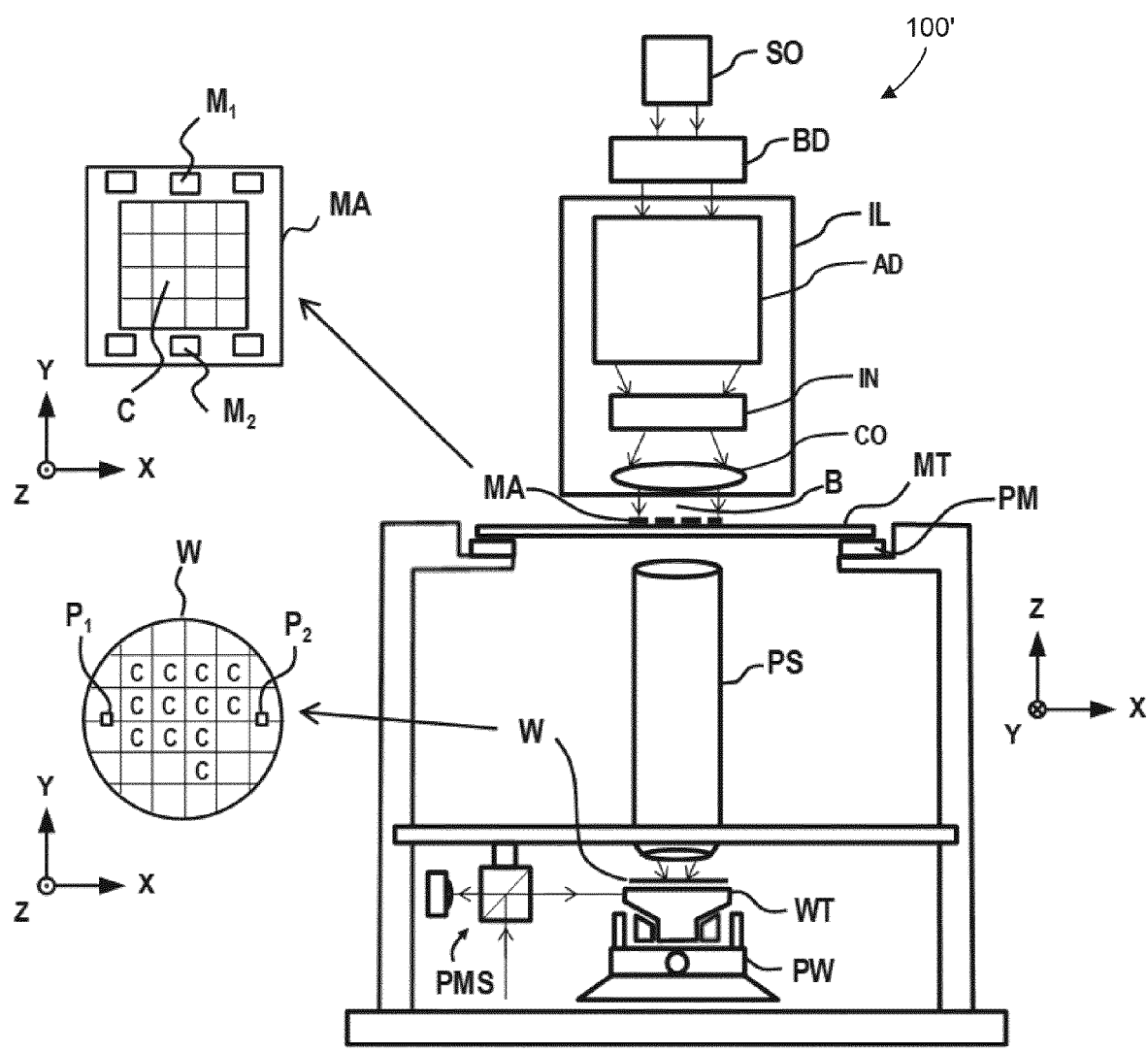
FIG. 1B is a schematic illustration of an example transmissive lithographic apparatus according to some aspects of the present disclosure.

FIGS. 1A and 1B are schematic illustrations of a lithographic apparatus 100 and lithographic apparatus 100', respectively, in which aspects of the present disclosure can be implemented. As shown in FIGS. 1A and 1B, the lithographic apparatuses 100 and 100' are illustrated from a point of view (e.g., a side view) that is normal to the XZ plane (e.g., the X-axis points to the right, the Z-axis points upward, and the Y-axis points into the page away from the viewer), while the patterning device MA and the substrate W are presented from additional points of view (e.g., a top view) that are normal to the XY plane (e.g., the X-axis points to the right, the Y-axis points upward, and the Z-axis points out of the page toward the viewer).

In some aspects, the lithographic apparatus 100 and/or the lithographic apparatus 100' can include one or more of the following structures: an illumination system IL (e.g., an illuminator) configured to condition a radiation beam B (e.g., a deep ultra violet (DUV) radiation beam or an extreme ultra violet (EUV) radiation beam); a support structure MT (e.g., a mask table) configured to support a patterning device MA (e.g., a mask, a reticle, or a dynamic patterning device) and connected to a first positioner PM configured to accurately position the patterning device MA; and, a substrate holder such as a substrate table WT (e.g., a wafer table) configured to hold a substrate W (e.g., a resist-coated wafer) and connected to a second positioner PW configured to accurately position the substrate W. Lithographic apparatuses 100 and 100' also have a projection system PS (e.g., a refractive projection lens system) configured to project a pattern imparted to the radiation beam B by patterning device MA onto a target portion C (e.g., a portion including one or more dies) of the substrate W. In lithographic apparatus 100, the patterning device MA and the projection system PS are reflective. In lithographic apparatus 100', the patterning device MA and the projection system PS are transmissive.

In some aspects, in operation, the illumination system IL can receive a radiation beam from a radiation source SO (e.g., via a beam delivery system BD shown in FIG. 1B). The illumination system IL can include various types of optical structures, such as refractive, reflective, catadioptric, magnetic, electromagnetic, electrostatic, and other types of optical components, or any combination thereof, for directing, shaping, or controlling radiation. In some aspects, the illumination system IL can be configured to condition the radiation beam B to have a desired spatial and angular intensity distribution in its cross-section at a plane of the patterning device MA.

In some aspects, the support structure MT can hold the patterning device MA in a manner that depends on the orientation of the patterning device MA with respect to a reference frame, the design of at least one of the lithographic apparatuses 100 and 100', and other conditions, such as whether or not the patterning device MA is held in a vacuum environment. The support structure MT can use mechanical, vacuum, electrostatic, or other clamping techniques to hold the patterning device MA. The support structure MT can be a frame or a table, for example, which can be fixed or movable, as required. By using sensors, the support structure MT can ensure that the patterning device MA is at a desired position, for example, with respect to the projection system PS.

The term "patterning device" MA should be broadly interpreted as referring to any device that can be used to impart a radiation beam B with a pattern in its cross-section, such as to create a pattern in the target portion C of the substrate W. The pattern imparted to the radiation beam B can correspond to a particular functional layer in a device being created in the target portion C to form an integrated circuit.

In some aspects, the patterning device MA can be transmissive (as in lithographic apparatus 100' of FIG. 1B) or reflective (as in lithographic apparatus 100 of FIG. 1A). The patterning device MA can include various structures such as reticles, masks, programmable mirror arrays, programmable LCD panels, other suitable structures, or combinations thereof. Masks can include mask types such as binary, alternating phase shift, or attenuated phase shift, as well as various hybrid mask types. In one example, a programmable mirror array can include a matrix arrangement of small mirrors, each of which can be individually tilted so as to reflect an incoming radiation beam in different directions. The tilted mirrors can impart a pattern in the radiation beam B, which is reflected by a matrix of small mirrors.

The term "projection system" PS should be interpreted broadly and can encompass any type of projection system, including refractive, reflective, catadioptric, magnetic, anamorphic, electromagnetic, and electrostatic optical systems, or any combination thereof, as appropriate for the exposure radiation being used, and/or for other factors such as the use of an immersion liquid (e.g., on the substrate W) or the use of a vacuum. A vacuum environment can be used for EUV or electron beam radiation since other gases can absorb too much radiation or electrons. A vacuum environment can therefore be provided to the whole beam path with the aid of a vacuum wall and vacuum pumps. In addition, any use herein of the term "projection lens" can be interpreted, in some aspects, as synonymous with the more general term "projection system" PS.

In some aspects, the lithographic apparatus 100 and/or the lithographic apparatus 100' can be of a type having two (e.g., "dual stage") or more substrate tables WT and/or two or more mask tables). In such "multiple stage" machines, the additional substrate tables WT can be used in parallel, or preparatory steps can be carried out on one or more tables while one or more other substrate tables WT are being used for exposure. In one example, steps in preparation of a subsequent exposure of the substrate W can be carried out on the substrate W located on one of the substrate tables WT while another substrate W located on another of the substrate tables WT is being used for exposing a pattern on another substrate W. In some aspects, the additional table may not be a substrate table WT.

In some aspects, in addition to the substrate table WT, the lithographic apparatus 100 and/or the lithographic apparatus 100' can include a measurement stage. The measurement stage can be arranged to hold a sensor. The sensor can be arranged to measure a property of the projection system PS, a property of the radiation beam B, or both. In some aspects, the measurement stage can hold multiple sensors. In some aspects, the measurement stage can move beneath the projection system PS when the substrate table WT is away from the projection system PS.

In some aspects, the lithographic apparatus 100 and/or the lithographic apparatus 100' can also be of a type wherein at least a portion of the substrate can be covered by a liquid having a relatively high refractive index, e.g., water, so as to fill a space between the projection system PS and the substrate W. An immersion liquid can also be applied to other spaces in the lithographic apparatus, for example, between the patterning device MA and the projection system PS Immersion techniques provide for increasing the numerical aperture of projection systems. The term "immersion" as used herein does not mean that a structure, such as a substrate, must be submerged in liquid, but rather only means that liquid is located between the projection system and the substrate during exposure. Various immersion techniques are described in U.S. Pat. No. 6,952,253, issued Oct. 4, 2005, and titled "LITHOGRAPHIC APPARATUS AND DEVICE MANUFACTURING METHOD," which is incorporated by reference herein in its entirety.

Referring to FIGS. 1A and 1B, the illumination system IL receives a radiation beam B from a radiation source SO. The radiation source SO and the lithographic apparatus 100 or 100' can be separate physical entities, for example, when the radiation source SO is an excimer laser. In such cases, the radiation source SO is not considered to form part of the lithographic apparatus 100 or 100', and the radiation beam B passes from the radiation source SO to the illumination system IL with the aid of a beam delivery system BD (e.g., shown in FIG. 1B) including, for example, suitable directing mirrors and/or a beam expander. In other cases, the radiation source SO can be an integral part of the lithographic apparatus 100 or 100', for example, when the radiation source SO is a mercury lamp. The radiation source SO and the illuminator IL, together with the beam delivery system BD, if required, can be referred to as a radiation system.

In some aspects, the illumination system IL can include an adjuster AD for adjusting the angular intensity distribution of the radiation beam. Generally, at least the outer and/or inner radial extent (commonly referred to as "σ-outer" and "σ-inner," respectively) of the intensity distribution in a pupil plane of the illuminator can be adjusted. In addition, the illumination system IL can include various other components, such as an integrator IN and a radiation collector CO (e.g., a condenser or collector optic). In some aspects, the illumination system IL can be used to condition the radiation beam B to have a desired uniformity and intensity distribution in its cross section.

Referring to FIG. 1A, in operation, the radiation beam B can be incident on the patterning device MA (e.g., a mask, reticle, programmable mirror array, programmable LCD panel, any other suitable structure or combination thereof), which can be held on the support structure MT (e.g., a mask table), and can be patterned by the pattern (e.g., design layout) present on the patterning device MA. In lithographic apparatus 100, the radiation beam B can be reflected from the patterning device MA. Having traversed (e.g., after being reflected from) the patterning device MA, the radiation beam B can pass through the projection system PS, which can focus the radiation beam B onto a target portion C of the substrate W or onto a sensor arranged at a stage.

In some aspects, with the aid of the second positioner PW and position sensor IFD2 (e.g., an interferometric device, linear encoder, or capacitive sensor), the substrate table WT can be moved accurately, e.g., so as to position different target portions C in the path of the radiation beam B. Similarly, the first positioner PM and another position sensor IFD1 (e.g., an interferometric device, linear encoder, or capacitive sensor) can be used to accurately position the patterning device MA with respect to the path of the radiation beam B.

In some aspects, patterning device MA and substrate W can be aligned using mask alignment marks M1 and M2 and substrate alignment marks P1 and P2. Although FIGS. 1A and 1B illustrate the substrate alignment marks P1 and P2 as occupying dedicated target portions, the substrate alignment marks P1 and P2 may be located in spaces between target portions. Substrate alignment marks P1 and P2 are known as scribe-lane alignment marks when they are located between the target portions C. Substrate alignment marks P1 and P2 can also be arranged in the target portion C area as in-die marks. These in-die marks can also be used as metrology marks, for example, for overlay measurements.

In some aspects, for purposes of illustration and not limitation, one or more of the figures herein can utilize a Cartesian coordinate system. The Cartesian coordinate system includes three axes: an X-axis; a Y-axis; and a Z-axis. Each of the three axes is orthogonal to the other two axes (e.g., the X-axis is orthogonal to the Y-axis and the Z-axis, the Y-axis is orthogonal to the X-axis and the Z-axis, the Z-axis is orthogonal to the X-axis and the Y-axis). A rotation around the X-axis is referred to as an Rx-rotation. A rotation around the Y-axis is referred to as an Ry-rotation. A rotation around about the Z-axis is referred to as an Rz-rotation. In some aspects, the X-axis and the Y-axis define a horizontal plane, whereas the Z-axis is in a vertical direction. In some aspects, the orientation of the Cartesian coordinate system may be different, for example, such that the Z-axis has a component along the horizontal plane. In some aspects, another coordinate system, such as a cylindrical coordinate system, can be used.

Referring to FIG. 1B, the radiation beam B is incident on the patterning device MA, which is held on the support structure MT, and is patterned by the patterning device MA. Having traversed the patterning device MA, the radiation beam B passes through the projection system PS, which focuses the beam onto a target portion C of the substrate W. In some aspects, the projection system PS can have a pupil conjugate to an illumination system pupil. In some aspects, portions of radiation can emanate from the intensity distribution at the illumination system pupil and traverse a mask pattern without being affected by diffraction at the mask pattern MP and create an image of the intensity distribution at the illumination system pupil.

The projection system PS projects an image MP' of the mask pattern MP, where image MP' is formed by diffracted beams produced from the mask pattern MP by radiation from the intensity distribution, onto a resist layer coated on the substrate W. For example, the mask pattern MP can include an array of lines and spaces. A diffraction of radiation at the array and different from zeroth-order diffraction generates diverted diffracted beams with a change of direction in a direction perpendicular to the lines. Undiffracted beams (e.g., so-called zeroth-order diffracted beams) traverse the pattern without any change in propagation direction. The zeroth-order diffracted beams traverse an upper lens or upper lens group of the projection system PS, upstream of the pupil conjugate of the projection system PS, to reach the pupil conjugate. The portion of the intensity distribution in the plane of the pupil conjugate and associated with the zeroth-order diffracted beams is an image of the intensity distribution in the illumination system pupil of the illumination system IL. In some aspects, an aperture device can be disposed at, or substantially at, a plane that includes the pupil conjugate of the projection system PS.

The projection system PS is arranged to capture, by means of a lens or lens group, not only the zeroth-order diffracted beams, but also first-order or first- and higher-order diffracted beams (not shown). In some aspects, dipole illumination for imaging line patterns extending in a direction perpendicular to a line can be used to utilize the resolution enhancement effect of dipole illumination. For example, first-order diffracted beams interfere with corresponding zeroth-order diffracted beams at the level of the substrate W to create an image of the mask pattern MP at highest possible resolution and process window (e.g., usable depth of focus in combination with tolerable exposure dose deviations). In some aspects, astigmatism aberration can be reduced by providing radiation poles (not shown) in opposite quadrants of an illumination system pupil. Further, in some aspects, astigmatism aberration can be reduced by blocking the zeroth-order beams in the pupil conjugate of the projection system PS associated with radiation poles in opposite quadrants. This is described in more detail in U.S. Pat. No. 7,511,799, issued Mar. 31, 2009, and titled "LITHOGRAPHIC PROJECTION APPARATUS AND A DEVICE MANUFACTURING METHOD," which is incorporated by reference herein in its entirety.

In some aspects, with the aid of the second positioner PW and a position measurement system PMS (e.g., including a position sensor such as an interferometric device, linear encoder, or capacitive sensor), the substrate table WT can be moved accurately, e.g., so as to position different target portions C in the path of the radiation beam B at a focused and aligned position. Similarly, the first positioner PM and another position sensor (e.g., an interferometric device, linear encoder, or capacitive sensor) (not shown in FIG. 1B) can be used to accurately position the patterning device MA with respect to the path of the radiation beam B (e.g., after mechanical retrieval from a mask library or during a scan). Patterning device MA and substrate W can be aligned using mask alignment marks M1 and M2 and substrate alignment marks P1 and P2.

In general, movement of the support structure MT can be realized with the aid of a long-stroke positioner (coarse positioning) and a short-stroke positioner (fine positioning), which form part of the first positioner PM. Similarly, movement of the substrate table WT can be realized using a long-stroke positioner and a short-stroke positioner, which form part of the second positioner PW. In the case of a stepper (as opposed to a scanner), the support structure MT can be connected to a short-stroke actuator only or can be fixed. Patterning device MA and substrate W can be aligned using mask alignment marks M1 and M2, and substrate alignment marks P1 and P2. Although the substrate alignment marks (as illustrated) occupy dedicated target portions, they can be located in spaces between target portions (e.g., scribe-lane alignment marks) Similarly, in situations in which more than one die is provided on the patterning device MA, the mask alignment marks M1 and M2 can be located between the dies.

Support structure MT and patterning device MA can be in a vacuum chamber V, where an in-vacuum robot can be used to move patterning devices such as a mask in and out of vacuum chamber. Alternatively, when support structure MT and patterning device MA are outside of the vacuum chamber, an out-of-vacuum robot can be used for various transportation operations, similar to the in-vacuum robot. In some instances, both the in-vacuum and out-of-vacuum robots need to be calibrated for a smooth transfer of any payload (e.g., a mask) to a fixed kinematic mount of a transfer station.

In some aspects, the lithographic apparatuses 100 and 100' can be used in at least one of the following modes:
1. In step mode, the support structure MT and the substrate table WT are kept essentially stationary, while an entire pattern imparted to the radiation beam B is projected onto a target portion C at one time (e.g., a single static exposure). The substrate table WT is then shifted in the X and/or Y direction so that a different target portion C can be exposed.
2. In scan mode, the support structure MT and the substrate table WT are scanned synchronously while a pattern imparted to the radiation beam B is projected onto a target portion C (e.g., a single dynamic exposure). The velocity and direction of the substrate table WT relative to the support structure MT (e.g., mask table) can be determined by the (de-)magnification and image reversal characteristics of the projection system PS.
3. In another mode, the support structure MT is kept substantially stationary holding a programmable patterning device MA, and the substrate table WT is moved or scanned while a pattern imparted to the radiation beam B is projected onto a target portion C. A pulsed radiation source SO can be employed and the programmable patterning device is updated as required after each movement of the substrate table WT or in between successive radiation pulses during a scan. This mode of operation can be readily applied to maskless lithography that utilizes a programmable patterning device MA, such as a programmable mirror array.

In some aspects, the lithographic apparatuses 100 and 100' can employ combinations and/or variations of the above-described modes of use or entirely different modes of use.

In some aspects, as shown in FIG. 1A, the lithographic apparatus 100 can include an EUV source configured to generate an EUV radiation beam B for EUV lithography. In general, the EUV source can be configured in a radiation source SO, and a corresponding illumination system IL can be configured to condition the EUV radiation beam B of the EUV source.

Figure 2:
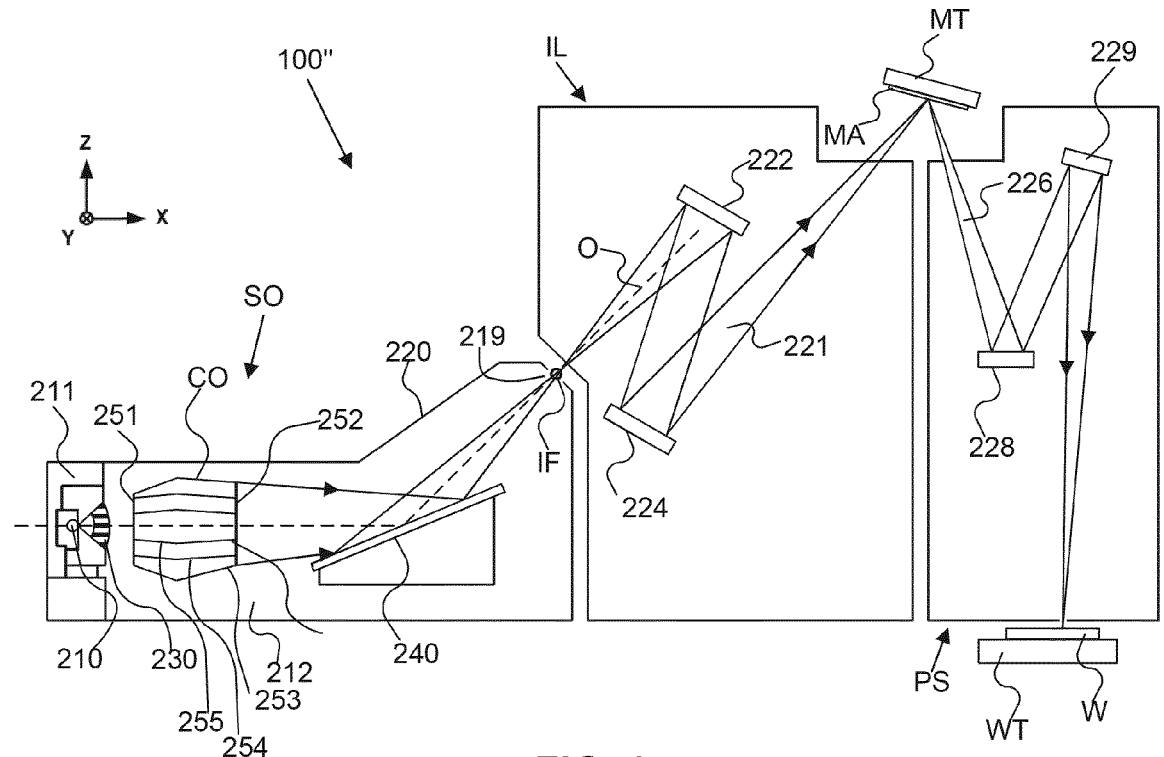
FIG. 2 is a more detailed schematic illustration of the reflective lithographic apparatus shown in FIG. 1A according to some aspects of the present disclosure.

FIG. 2 shows the lithographic apparatus 100 in more detail, including the radiation source SO (e.g., a source collector apparatus), the illumination system IL, and the projection system PS. As shown in FIG. 2, the lithographic apparatus 100 is illustrated from a point of view (e.g., a side view) that is normal to the XZ plane (e.g., the X-axis points to the right and the Z-axis points upward).

The radiation source SO is constructed and arranged such that a vacuum environment can be maintained in an enclosing structure 220. The radiation source SO includes a source chamber 211 and a collector chamber 212 and is configured to produce and transmit EUV radiation. EUV radiation can be produced by a gas or vapor, for example xenon (Xe) gas, lithium (Li) vapor, or tin (Sn) vapor in which an EUV radiation emitting plasma 210 is created to emit radiation in the EUV range of the electromagnetic spectrum. The EUV radiation emitting plasma 210, at least partially ionized, can be created by, for example, an electrical discharge or a laser beam. Partial pressures of, for example, about 10.0 pascals (Pa) of Xe gas, Li vapor, Sn vapor, or any other suitable gas or vapor can be used for efficient generation of the radiation. In some aspects, a plasma of excited tin is provided to produce EUV radiation.

The radiation emitted by the EUV radiation emitting plasma 210 is passed from the source chamber 211 into the collector chamber 212 via an optional gas barrier or contaminant trap 230 (e.g., in some cases also referred to as contaminant barrier or foil trap), which is positioned in or behind an opening in source chamber 211. The contaminant trap 230 can include a channel structure. Contamination trap 230 can also include a gas barrier or a combination of a gas barrier and a channel structure. The contaminant trap 230 further indicated herein at least includes a channel structure.

The collector chamber 212 can include a radiation collector CO (e.g., a condenser or collector optic), which can be a so-called grazing incidence collector. Radiation collector CO has an upstream radiation collector side 251 and a downstream radiation collector side 252. Radiation that traverses radiation collector CO can be reflected off a grating spectral filter 240 to be focused in a virtual source point IF. The virtual source point IF is commonly referred to as the intermediate focus, and the source collector apparatus is arranged such that the virtual source point IF is located at or near an opening 219 in the enclosing structure 220. The virtual source point IF is an image of the EUV radiation emitting plasma 210. Grating spectral filter 240 is used in particular for suppressing infrared (IR) radiation.

Subsequently the radiation traverses the illumination system IL, which can include a faceted field mirror device 222 and a faceted pupil mirror device 224 arranged to provide a desired angular distribution of the radiation beam 221, at the patterning device MA, as well as a desired uniformity of radiation intensity at the patterning device MA. Upon reflection of the radiation beam 221 at the patterning device MA, held by the support structure MT, a patterned beam 226 is formed and the patterned beam 226 is imaged by the projection system PS via reflective elements 228, 229 onto a substrate W held by the wafer stage or substrate table WT.

More elements than shown can generally be present in illumination system IL and projection system PS. Optionally, the grating spectral filter 240 can be present depending upon the type of lithographic apparatus. Further, there can be more mirrors present than those shown in the FIG. 2. For example, there can be one to six additional reflective elements present in the projection system PS than shown in FIG. 2.

Radiation collector CO, as illustrated in FIG. 2, is depicted as a nested collector with grazing incidence reflectors 253, 254, and 255, just as an example of a collector (or collector mirror). The grazing incidence reflectors 253, 254, and 255 are disposed axially symmetric around an optical axis O and a radiation collector CO of this type is preferably used in combination with a discharge produced plasma (DPP) source.

Example Lithographic Cell

Figure 3:
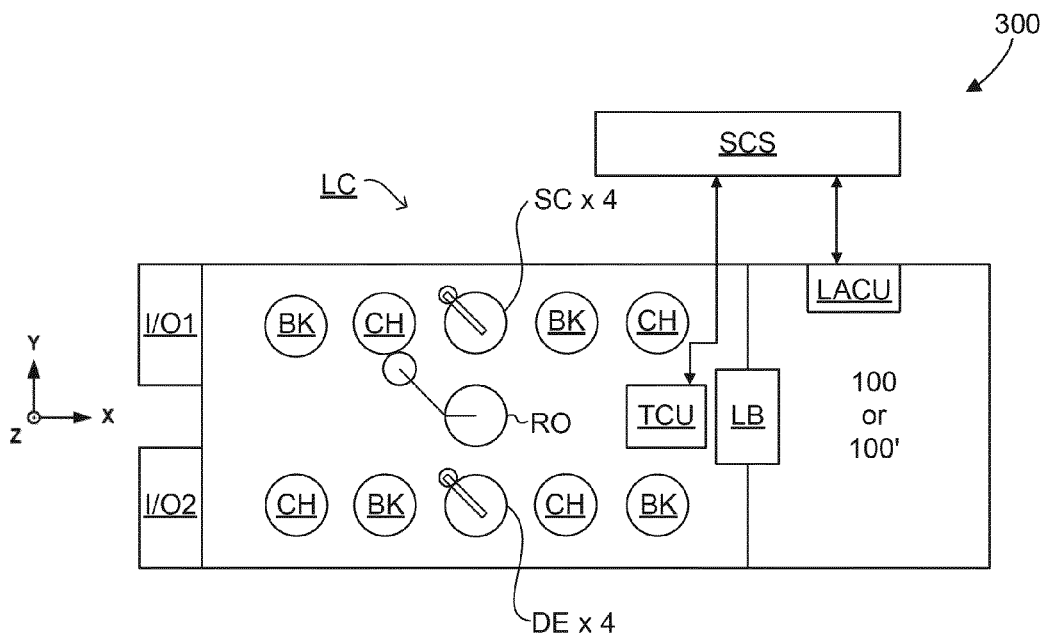
FIG. 3 is a schematic illustration of an example lithographic cell according to some aspects of the present disclosure.

FIG. 3 shows a lithographic cell 300, also sometimes referred to a lithocell or cluster. As shown in FIG. 3, the lithographic cell 300 is illustrated from a point of view (e.g., a top view) that is normal to the XY plane (e.g., the X-axis points to the right and the Y-axis points upward).

Lithographic apparatus 100 or 100' can form part of lithographic cell 300. Lithographic cell 300 can also include one or more apparatuses to perform pre- and post-exposure processes on a substrate. For example, these apparatuses can include spin coaters SC to deposit resist layers, developers DE to develop exposed resist, chill plates CH, and bake plates BK. A substrate handler RO (e.g., a robot) picks up substrates from input/output ports I/O1 and I/O2, moves them between the different process apparatuses and delivers them to the loading bay LB of the lithographic apparatus 100 or 100'. These devices, which are often collectively referred to as the track, are under the control of a track control unit TCU, which is itself controlled by a supervisory control system SCS, which also controls the lithographic apparatus via lithography control unit LACU. Thus, the different apparatuses can be operated to maximize throughput and processing efficiency.

Example Radiation Source

Figure 4:
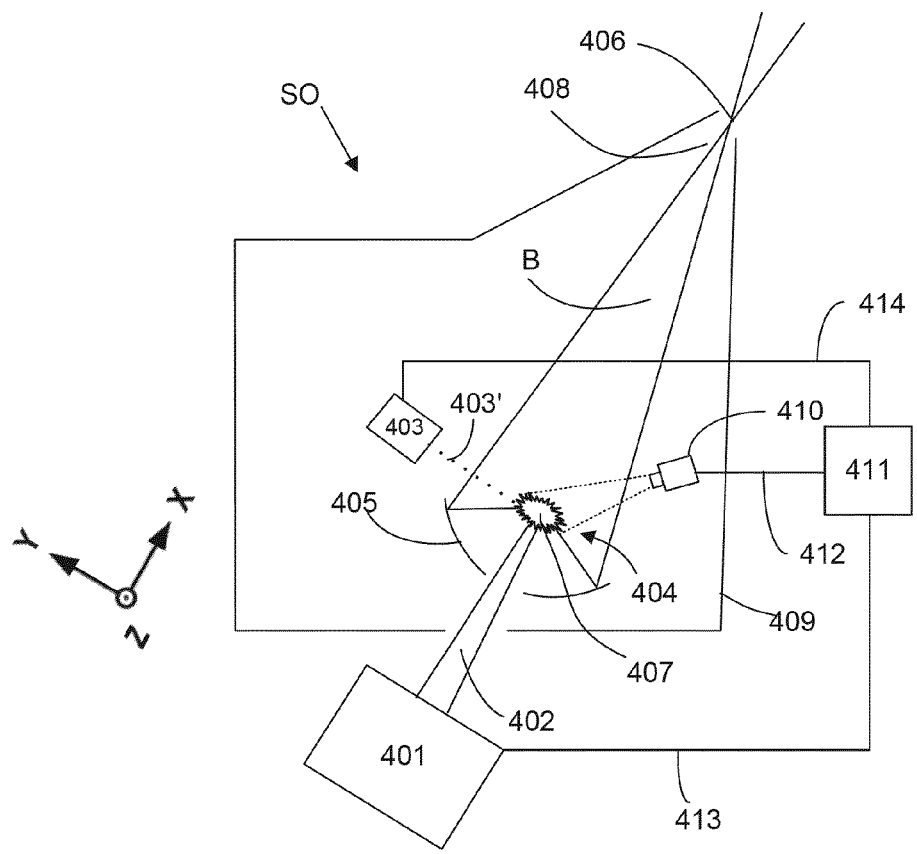
FIG. 4 is a schematic illustration of an example radiation source for an example reflective lithographic apparatus according to some aspects of the present disclosure.

An example of the radiation source SO for an example reflective lithographic apparatus (e.g., lithographic apparatus 100 of FIG. 1A) is shown in FIG. 4. As shown in FIG. 4, the radiation source SO is illustrated from a point of view (e.g., a top view) that is normal to the XY plane as described below.

The radiation source SO shown in FIG. 4 is of a type which can be referred to as a laser produced plasma (LPP) source. A laser system 401, which can for example include a carbon dioxide ($CO_2$) laser, is arranged to deposit energy via one or more laser beams 402 into fuel targets 403', such as one or more discrete tin (Sn) droplets, which are provided from a fuel target generator 403 (e.g., example, fuel emitter, droplet generator). According to some aspects, laser system 401 can be, or can operate in the fashion of, a pulsed, continuous wave or quasi-continuous wave laser. The trajectory of fuel targets 403' (e.g., example, droplets) emitted from the fuel target generator 403 can be parallel to an X-axis. According to some aspects, the one or more laser beams 402 propagate in a direction parallel to a Y-axis, which is perpendicular to the X-axis. A Z-axis is perpendicular to both the X-axis and the Y-axis and extends generally into (or out of) the plane of the page, but in other aspects, other configurations are used. In some embodiments, the laser beams 402 can propagate in a direction other than parallel to the Y-axis (e.g., in a direction other than orthogonal to the X-axis direction of the trajectory of the fuel targets 403').

In some aspects, the one or more laser beams 402 can include a pre-pulse laser beam and a main pulse laser beam. In such aspects, the laser system 401 can be configured to hit each of the fuel targets 403' with a pre-pulse laser beam to generate a modified fuel target. The laser system 401 can be further configured to hit each of the modified fuel targets with a main pulse laser beam to generate the plasma 407.

Although tin is referred to in the following description, any suitable target material can be used. The target material can for example be in liquid form, and can for example be a metal or alloy. Fuel target generator 403 can include a nozzle configured to direct tin, e.g., in the form of fuel targets 403' (e.g., discrete droplets) along a trajectory towards a plasma formation region 404. Throughout the remainder of the description, references to "fuel", "fuel target" or "fuel droplet" are to be understood as referring to the target material (e.g., droplets) emitted by fuel target generator 403. Fuel target generator 403 can include a fuel emitter. The one or more laser beams 402 are incident upon the target material (e.g., tin) at the plasma formation region 404. The deposition of laser energy into the target material creates a plasma 407 at the plasma formation region 404. Radiation, including EUV radiation, is emitted from the plasma 407 during de-excitation and recombination of ions and electrons of the plasma.

The EUV radiation is collected and focused by a radiation collector 405 (e.g., radiation collector CO). In some aspects, radiation collector 405 can include a near normal-incidence radiation collector (sometimes referred to more generally as a normal-incidence radiation collector). The radiation collector 405 can be a multilayer structure, which is arranged to reflect EUV radiation (e.g., EUV radiation having a desired wavelength such as about 13.5 nm). According to some aspects, radiation collector 405 can have an ellipsoidal configuration, having two focal points. A first focal point can be at the plasma formation region 404, and a second focal point can be at an intermediate focus 406, as discussed herein.

In some aspects, laser system 401 can be located at a relatively long distance from the radiation source SO. Where this is the case, the one or more laser beams 402 can be passed from laser system 401 to the radiation source SO with the aid of a beam delivery system (not shown) including, for example, suitable directing mirrors and/or a beam expander, and/or other optics. Laser system 401 and the radiation source SO can together be considered to be a radiation system.

Radiation that is reflected by radiation collector 405 forms a radiation beam B. The radiation beam B is focused at a point (e.g., the intermediate focus 406) to form an image of plasma formation region 404, which acts as a virtual radiation source for the illumination system IL. The point at which the radiation beam B is focused can be referred to as the intermediate focus (IF) (e.g., intermediate focus 406). The radiation source SO is arranged such that the intermediate focus 406 is located at or near to an opening 408 in an enclosing structure 409 of the radiation source SO.

The radiation beam B passes from the radiation source SO into the illumination system IL, which is configured to condition the radiation beam B. The radiation beam B passes from the illumination system IL and is incident upon the patterning device MA held by the support structure MT. The patterning device MA reflects and patterns the radiation beam B. Following reflection from the patterning device MA the patterned radiation beam B enters the projection system PS. The projection system includes a plurality of mirrors, which are configured to project the radiation beam B onto a substrate W held by the substrate table WT. The projection system PS can apply a reduction factor to the radiation beam, forming an image with features that are smaller than corresponding features on the patterning device MA. For example, a reduction factor of four can be applied. Although the projection system PS is shown as having two mirrors in FIG. 2, the projection system can include any number of mirrors (e.g., six mirrors).

The radiation source SO can also include components which are not illustrated in FIG. 4. For example, a spectral filter can be provided in the radiation source SO. The spectral filter can be substantially transmissive for EUV radiation but substantially blocking for other wavelengths of radiation such as infrared radiation.

The radiation source SO (or radiation system) can further include a fuel target imaging system to obtain images of fuel targets (e.g., droplets) in the plasma formation region 404 or, more particularly, to obtain images of shadows of the fuel targets. The fuel target imaging system can detect light diffracted from the edges of the fuel targets. References to images of the fuel targets in the following text should be understood also to refer to images of shadows of the fuel targets or diffraction patterns caused by the fuel targets.

The fuel target imaging system can include a photodetector such as a CCD array or a CMOS sensor, but it will be appreciated that any imaging device suitable for obtaining images of the fuel targets can be used. It will be appreciated that the fuel target imaging system can include optical components, such as one or more lenses, in addition to a photodetector. For example, the fuel target imaging system can include a camera 410, e.g., a combination of a photosensor or photodetector and one or more lenses. The optical components can be selected so that the photosensor or camera 410 obtains near-field images and/or far-field images. The camera 410 can be positioned within the radiation source SO at any appropriate location from which the camera has a line of sight to the plasma formation region 404 and one or more markers (not shown in FIG. 4) provided on the radiation collector 405. In some aspects, however, it can be necessary to position the camera 410 away from the propagation path of the one or more laser beams 402 and from the trajectory of the fuel targets emitted from fuel target generator 403 so as to avoid damage to the camera 410. According to some aspects, the camera 410 is configured to provide images of the fuel targets to a laser controller 411 via a connection 412. The connection 412 is shown as a wired connection, though it will be appreciated that the connection 412 (and other connections referred to herein) can be implemented as either a wired connection or a wireless connection or a combination thereof.

As shown in FIG. 4, the radiation source SO can include a fuel target generator 403 configured to generate and emit fuel targets 403' (e.g., discrete tin droplets) towards a plasma formation region 404. The radiation source SO can further include a laser system 401 configured to hit one or more of the fuel targets 403' with one or more laser beams 402 for generating a plasma 407 at the plasma formation region 404. The radiation source SO can further include a radiation collector 405 (e.g., a radiation collector CO) configured to collect radiation emitted by the plasma 407.

Example Laser System

Figure 5:
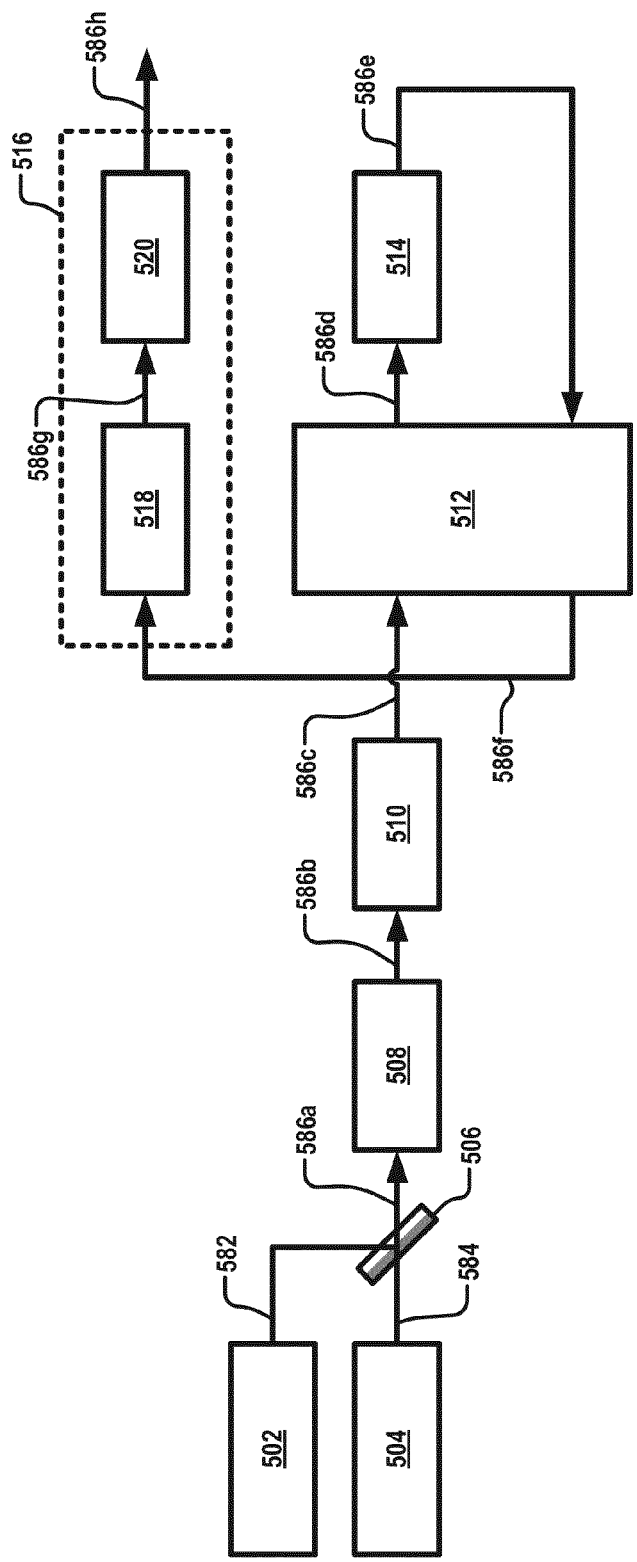
FIG. 5 is a schematic illustration of an example laser system according to some aspects of the present disclosure.

FIG. 5 is a schematic illustration of an example laser system 500 according to some aspects of the present disclosure. In some aspects, the example laser system 500 can include a first laser source 502 (e.g., a CO2 pre-pulse seed laser source), a second laser source 504 (e.g., a CO2 main pulse seed laser source), a beam path combiner 506 (e.g., a dichroic beam splitter (DBS), a thin-film polarizer (TFP), a beam multiplexer, or any other suitable optical structure or combination of optical structures), an EOM 508 (e.g., a triple-crystal EOM, a triple-triggered EOM), a first AOM 510, a dual-pass amplifier 512, a second AOM 514, and a laser isolation system 516 including a third AOM 518 and, in some optional aspects, a fourth AOM 520. Additionally or alternatively, in some aspects, the example laser system 500 can include any of the structures, techniques, or features described with reference to the laser system 401 described with reference to FIG. 4, the example laser system 600 described with reference to FIG. 6, the example laser system 700 described with reference to FIG. 7, the example laser system 800 described with reference to FIG. 8, or any combination thereof.

In some aspects, the first laser source 502 can be configured to generate a first laser beam (e.g., a pre-pulse laser beam) that travels along a first beam path 582 to the beam path combiner 506. In some aspects, the second laser source 504 can be configured to generate a second laser beam (e.g., a main pulse laser beam) that travels along a second beam path 584 to the beam path combiner 506. In some aspects, the beam path combiner 506 can be configured to combine the first beam path 582 and the second beam path 584 to generate a common beam path 586 for both the first laser beam and the second laser beam.

In some aspects, the first laser beam and the second laser beam can travel from an output of the beam path combiner 506 to an input of the EOM 508 along a first portion 586a of the common beam path 586. In some aspects, the first laser beam and the second laser beam can travel from an output of the EOM 508 to an input of the first AOM 510 along a second portion 586b of the common beam path 586.

In some aspects, the first laser beam and the second laser beam can travel from an output of the first AOM 510 to a first-pass input of the dual-pass amplifier 512 along a third portion 586c of the common beam path 586. In some aspects, after making a first pass through the dual-pass amplifier 512, the first laser beam and the second laser beam can travel from a first-pass output of the dual-pass amplifier 512 to an input of the second AOM 514 along a fourth portion 586d of the common beam path 586. In some aspects, the first laser beam and the second laser beam can travel from an output of the second AOM 514 to a second-pass input of the dual-pass amplifier 512 along a fifth portion 586e of the common beam path 586.

In some instances, the example laser system 500 can include a polarization rotator disposed along the common beam path 586 after the second AOM 514 and before the second input of the dual-pass amplifier 512. The polarization rotator can be configured to rotate the polarization of the first laser beam, the second laser beam, or both by any suitable degree of rotation, such as 90 degrees.

In some aspects, after making a second pass through the dual-pass amplifier 512, the first laser beam and the second laser beam can travel from a second-pass output of the dual-pass amplifier 512 to an input the third AOM 518 along a sixth portion 586f of the common beam path 586.

In some aspects, the first laser beam and the second laser beam can travel from an output of the third AOM 518 to an input of the fourth AOM 520 along a seventh portion 586g of the common beam path 586. In some aspects, the first laser beam and the second laser beam can travel from an output of the fourth AOM 520 along an eighth portion 586h of the common beam path 586. In some aspects, the fourth AOM 520 can be optional and not included in the laser isolation system 516.

As a foundation for some embodiments, the example laser system 500 can include a first laser source 502 configured to generate a first laser beam (e.g., one of the one or more laser beams 402). The example laser system 500 can further include a second laser source 504 configured to generate a second laser beam (e.g., another of the one or more laser beams 402). The example laser system 500 can further include a dual-pass amplifier 512 configured to perform dual-pass amplification of the first laser beam along a common beam path 586. The dual-pass amplifier 512 can be further configured to perform dual-pass amplification of the second laser beam along the common beam path 586.

In some aspects, the first laser beam can include a pre-pulse laser beam. In some aspects, the second laser beam can include a main pulse laser beam. In some aspects, the pre-pulse laser beam and the main pulse laser beam can be separated in time by a duration of less than about 3 microseconds (e.g., about 2 microseconds). In some aspects, the example laser system 500 can be configured to hit a fuel target (e.g., one of the fuel targets 403') with the pre-pulse laser beam to generate a modified fuel target. In some aspects, the example laser system 500 can be further configured to hit the modified fuel target with the main pulse laser beam to generate a plasma (e.g., the plasma 407) at a plasma formation region (e.g., the plasma formation region 404).

In some aspects, the first laser beam can include a first wavelength. In some aspects, the second laser beam can include a second wavelength different from the first wavelength. In some aspects, the second wavelength can be greater than about the first wavelength.

In some aspects, an AOM (e.g., the first AOM 510, the second AOM 514, the third AOM 518, the fourth AOM 520, any other suitable AOM or structure, or any combination thereof) can be configured to generate, based on a first radio frequency of a first radio wave, a first acoustic grating configured to diffract the first laser beam. In some aspects, the AOM can be further configured to generate, based on a second radio frequency of a second radio wave, a second acoustic grating configured to diffract the second laser beam. In some aspects, the AOM can be further configured to output, based on the first acoustic grating, the first laser beam at a first diffraction angle. In some aspects, the AOM can be further configured to output, based on the second acoustic grating, the second laser beam at a second diffraction angle. In some aspects, a first mathematical product of the first wavelength of the first laser beam and the first radio frequency of the first radio wave can be about equal to a second mathematical product of the second wavelength of the second laser beam and the second radio frequency of the second radio wave. In some aspects, the second diffraction angle can be about equal to the first diffraction angle such that the diffracted first laser beam and the diffracted second laser beam along the common beam path. In some aspects, mathematical multiplication between optical wavelength of light and radio frequency represents the "acousto-optical" effect in the AOM.

In one illustrative example, the first wavelength of the first laser beam and the first radio frequency of the first radio wave can be about 10.26 micrometers (microns) and about 41.29 MHz, respectively, and the second wavelength of the second laser beam and the second radio frequency of the second radio wave can be about 10.59 microns and about 40 MHz, respectively. Accordingly, the first mathematical product of the first wavelength of the first laser beam and the first radio frequency of the first radio wave can be about 423.64, and the second mathematical product of the second wavelength of the second laser beam and the second radio frequency of the second radio wave can be about 423.60, which is about equal to the first mathematical product.

In some aspects, the example laser system 500 can further include a laser controller (e.g., laser controller 411, example computing system 1000). In some aspects, the laser controller can include AOM radio frequency (RF) driver configured to drive an AOM (e.g., by generating AOM control signals configured to instruct the AOM to generate radio waves, generate acoustic wave packets, generate acoustic gratings, and perform other suitable operations, and transmitting the generated AOM control signals to the AOM). In some aspects, the laser controller can be configured to provide for dual-wavelength operation (e.g., pre-pulse and main pulse) of the AOM using an "RF frequency matching to wavelength" technique to provide for diffraction of the pre-pulse laser beam and the main pulse laser beam into the same direction. For example, the laser controller can be configured to determine the first wavelength of the first laser beam and the first radio frequency of the first radio wave based on the second mathematical product of the second wavelength of the second laser beam and the second radio frequency of the second radio wave as indicated by Equations 1 and 2:

$$\sin(\theta_B) = \frac{\lambda_{PP} f_{a,PP}}{2V_a} = \frac{\lambda_{MP} f_{a,MP}}{2V_a} \quad (1)$$

$$\lambda_{PP} f_{a,PP} = \lambda_{MP} f_{a,MP} \quad (2)$$

where $\theta_B$ represents the diffraction angle, $\lambda_{PP}$ represents the wavelength of the pre-pulse laser beam, $f_{a,PP}$ represents the radio frequency of a radio wave used to generate an acoustic grating within the AOM to diffract the pre-pulse laser beam, Amp represents the wavelength of the main pulse laser beam, $f_{a,MP}$ represents the radio frequency of a radio wave used to generate an acoustic grating within the AOM to diffract to diffract the main pulse laser beam, and $V_a$ represents the speed of sound in the AOM (e.g., the speed of sound in germanium (Ge) where the AOM includes a Ge crystal). In one illustrative example, the laser controller can determine that the first wavelength and the first radio frequency can be about 10.26 microns and about 41.29 MHz, respectively, based on electronic information indicating that the second wavelength and the second radio frequency are about 10.59 microns and about 40 MHz, respectively. In other aspects, the laser controller can be configured to determine the second wavelength and the second radio frequency based on the first mathematical product of the first wavelength and the first radio frequency. In some aspects, dual-wavelength operation of the AOM can be provided by altering the RF driver connected to the AOM without changing the AOM itself.

In some aspects, to provide for dual-wavelength operation of an AOM, the laser controller (e.g., using the AOM RF driver) can be configured to match the radio frequency applied to the AOM to the particular wavelength of incident light such that the product of the two remains constant. In some aspects, to provide for dual-wavelength operation of the AOM, the laser controller can be further configured to control the power balance between two laser beams by, for example, controlling the amplitude of the acoustic wave applied to the AOM for a given laser beam. In an illustrative example, the laser controller can be configured to generate and transmit an AOM control signal configured to instruct the AOM to: generate a first acoustic wave packet having a frequency, amplitude, and packet arrival time that matches the first laser beam; and apply the first acoustic wave packet to the first laser beam. The AOM control signal can further instruct the AOM to: generate a second acoustic wave packet having a frequency, amplitude, and packet arrival time that matches the second laser beam; and apply the second acoustic wave packet to the second laser beam. In some aspects, the first and second acoustic wave packets can be different. For example, the second acoustic wave packet can have a different frequency, amplitude, and packet arrival time than the first acoustic wave packet. In some aspects, by matching RF frequencies, the laser controller can be configured to preserve the common beam path via the same diffraction angle. In some aspects, by controlling different acoustic wave packet amplitudes, the laser controller can be configured to achieve a desired balance of power between the first and second laser beams. In some aspects, by matching acoustic packet arrival times, the laser controller can be configured to achieve optical isolation when an incident laser pulse is not present.

In some aspects, the example laser system 500 can further include an EOM 508 disposed between the second laser source 504 and the dual-pass amplifier 512. In some aspects, the EOM 508 can be configured to output the first laser beam along the common beam path 586. In some aspects, the EOM 508 can be further configured to output the second laser beam along the common beam path 586.

In some aspects, the EOM 508 can include a first single-crystal EOM, a second single-crystal EOM, and a third single-crystal EOM. In some aspects, the EOM 508 can include a single-crystal EOM and a double-crystal EOM. In some aspects, the EOM 508 can include a triple-crystal EOM.

In some aspects, the example laser system 500 can further include a first AOM 510 disposed along the common beam path 586 between the EOM 508 and the dual-pass amplifier 512. In some aspects, the first AOM 510 can be configured to receive the first laser beam from the EOM 508 along the common beam path 586. In some aspects, the first AOM 510 can be further configured to receive the second laser beam from the EOM 508 along the common beam path 586. In some aspects, the first AOM 510 can be further configured to output the first laser beam to the dual-pass amplifier 512 along the common beam path 586. In some aspects, the first AOM 510 can be further configured to output the second laser beam to the dual-pass amplifier 512 along the common beam path 586. In some aspects, the first AOM 510 can be further configured to output the first laser beam at a first diffraction angle. In some aspects, the first AOM 510 can be further configured to output the second laser beam at a second diffraction angle. In some aspects, the second diffraction angle can be about equal to the first diffraction angle (e.g., as described above with reference to Equation 1).

In some aspects, the example laser system 500 can further include a second AOM 514 disposed along the common beam path 586. In some aspects, the second AOM 514 can be configured to receive the first laser beam from the dual-pass amplifier 512 along the common beam path 586. In some aspects, the second AOM 514 can be further configured to receive the second laser beam from the dual-pass amplifier 512 along the common beam path 586. In some aspects, the second AOM 514 can be further configured to generate a modified first laser beam based on a first wavelength of the first laser beam. In some aspects, the second AOM 514 can be further configured to generate a modified second laser beam based on a second wavelength of the second laser beam. Additionally or alternatively, in some aspects, the second AOM 514 can be further configured to generate the modified first laser beam based on a first rotation of a first polarization of the first laser beam and to generate the modified second laser beam based on a second rotation of a second polarization of the second laser beam, e.g., to improve the efficiency of the second AOM 514. In some aspects, the second AOM 514 can be further configured to output the modified first laser beam to the dual-pass amplifier 512 along the common beam path 586. In some aspects, the second AOM 514 can be further configured to output the modified second laser beam to the dual-pass amplifier 512 along the common beam path 586. In some aspects, the dual-pass amplifier 512 can be further configured to perform dual-pass amplification of the first laser beam based on a first amplification of the first laser beam and a second amplification of the modified first laser beam. In some aspects, the dual-pass amplifier 512 can be further configured to perform dual-pass amplification of the second laser beam based on a third amplification of the second laser beam and a fourth amplification of the modified second laser beam.

In some aspects, the example laser system 500 can further include a laser isolation system 516 (e.g., optical isolation) disposed downstream of the dual-pass amplifier 512 along the common beam path 586. In some aspects, the laser isolation system 516 can be configured to receive a dual-pass amplified first laser beam from the dual-pass amplifier 512 along the common beam path 586. In some aspects, the laser isolation system 516 can be further configured to receive a dual-pass amplified second laser beam from the dual-pass amplifier 512 along the common beam path 586. In some aspects, the laser isolation system 516 can be further configured to generate an isolated first laser beam based on the dual-pass amplified first laser beam. In some aspects, the laser isolation system 516 can be further configured to generate an isolated second laser beam based on the dual-pass amplified second laser beam. In some aspects, the isolated first laser beam can include a first isolation factor of greater than 10,000 times. In some aspects, the isolated second laser beam can include a second isolation factor of greater than 10,000 times. In some aspects, the laser isolation system 516 can include one or more Faraday isolators instead of AOMs or EOMs.

In some aspects, the laser isolation system 516 can include a third AOM 518 disposed downstream of the dual-pass amplifier 512 along the common beam path 586. Optionally, in some aspects, the laser isolation system 516 can further include a fourth AOM 520 disposed downstream of the third AOM 518 along the common beam path 586.

In some aspects, utilization of isolation, glint control, and periodic time-dependent gain extraction in the example laser system 500 can provide for simplification of the example laser system 500 and stable operation of the dual-pass amplifier 512. In one illustrative example, the gain in the example laser system 500 can be very dynamic and change by a factor of around 3,500 fold during a time period of about 20 microseconds (e.g., between two sequential pre-pulse laser beam pulses, between two sequential main pulse laser beam pulses). For example, for the main pulse laser beam, the gain in the example laser system 500 begins at the gain extracted by the previous pulse, increases due to continuous RF pumping until reaching a maximum small signal gain (e.g., including the gain of the dual-pass amplifier 512), decreases based on the pre-pulse partially-extracted gain (e.g., the gain extracted from the main pulse laser beam due to reflection of the pre-pulse laser beam), increases again due to continuous RF pumping, decreases based on the first-pass main pulse partially-extracted gain (e.g., the gain extracted from the main pulse laser beam due to the first pass of the main pulse laser beam through the dual-pass amplifier 512), increases yet again due to continuous RF pumping, and subsequently decreases based on the second-pass main pulse partially-extracted gain (e.g., the gain extracted from the main pulse laser beam due to the second pass of the main pulse laser beam through the dual-pass amplifier 512). In some aspects, the effects of plasma reflection further impact the gain in the example laser system 500.

In some aspects, isolation, glint control, and gain extraction techniques can include, but are not limited to utilization of: (i) time-dependent gain characteristics before and after the pre-pulse laser beam and the main-pulse laser beam extract the gain from the dual-pass amplifier 512; (ii) the distribution of gain, glint, and isolation along the optical path in the example laser system 500; (iii) the isolation in the example laser system 500 relative to the small signal gain in the example laser system 500; and (iv) the appropriate amount of isolation in the proper places in the optical system of the example laser system 500.

Figure 6:
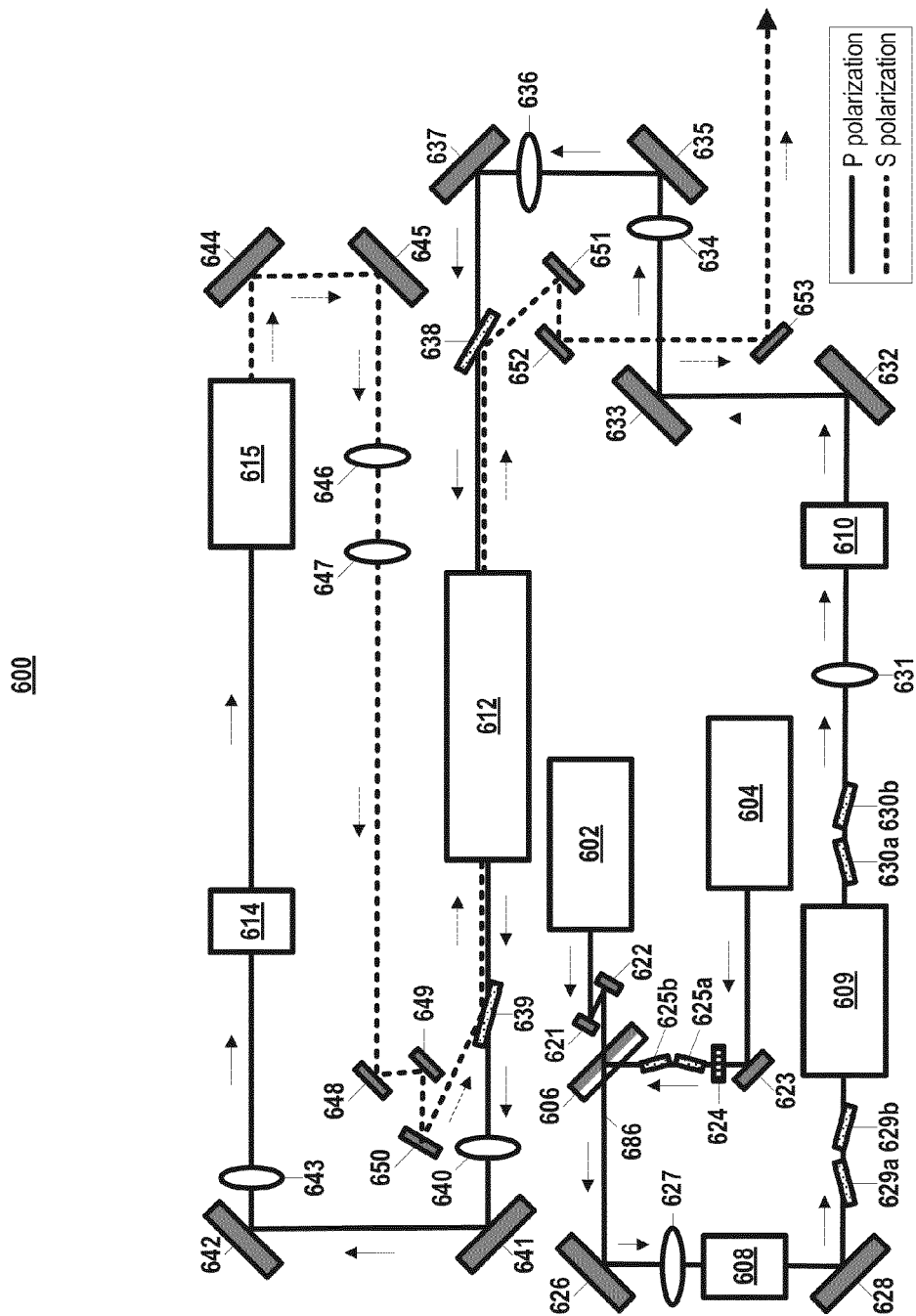
FIG. 6 is a schematic illustration of another example laser system according to some aspects of the present disclosure.

FIG. 6 is a schematic illustration of an example laser system 600 according to some aspects of the present disclosure. In some aspects, the example laser system 600 can include a first laser source 602 (e.g., a CO2 pre-pulse seed laser source), a second laser source 604 (e.g., a CO2 main pulse seed source), a beam path combiner 606 (e.g., a DBS, a TFP, a beam multiplexer, or any other suitable optical structure or combination of optical structures), a first EOM 608 (e.g., a single-crystal EOM, a single-triggered EOM), an EOM system 609 (e.g., a double-crystal EOM, a double-triggered EOM), a first AOM 610, a dual-pass amplifier 612, a second AOM 614, and a polarization rotator 615. In some aspects, the EOM system 609 can include a second EOM (e.g., a single-crystal EOM, a single-triggered EOM), a third EOM (e.g., a single-crystal EOM, a single-triggered EOM), and a pair of TFPs disposed between the second EOM and the third EOM. Additionally or alternatively, in some aspects, the example laser system 600 can include any of the structures, techniques, or features described with reference to the laser system 401 described with reference to FIG. 4, the example laser system 500 described with reference to FIG. 5, the example laser system 700 described with reference to FIG. 7, the example laser system 800 described with reference to FIG. 8, or any combination thereof. In some aspects, the example laser system 600 can include one or more metrology or safety-related components, such as one or more polarization sensors, power sensors, spectrometers, attenuators (e.g., step attenuators, continuously variable attenuators), polarizers, filters, shutters, beam splitters, photoelectromagnetic sensors (PEMs), photomultipliers (PMs), metrology beam pick-offs, coatings (e.g., optical coatings), actuators (e.g., servo motors, servo controllers), any other suitable structures or components, and any combination thereof.

In some aspects, the first laser source 602 can be configured to generate a first laser beam (e.g., a pre-pulse laser beam) that travels along a first beam path to a mirror 621, a mirror 622, and the beam path combiner 606. In some aspects, the second laser source 604 can be configured to generate a second laser beam (e.g., a main pulse laser beam) that travels along a second beam path to a mirror 623, a wave plate 624 (e.g., a quarter-wave plate or a half-wave plate), a TFP 625a, a TFP 625b, and the beam path combiner 606. In some aspects, the beam path combiner 606 can be configured to combine the first beam path and the second beam path to generate a common beam path 686 for both the first laser beam and the second laser beam.

In some aspects, the first laser beam and the second laser beam can travel along the common beam path 686 from an output of the beam path combiner 606 to a mirror 626, a lens 627 (e.g., a 635 millimeter (mm) lens), and an input of the first EOM 608. In some aspects, the first laser beam and the second laser beam can travel along the common beam path 686 from an output of the first EOM 608 to a mirror 628, a TFP 629a, a TFP 629b and an input of the EOM system 609. In some aspects, the first laser beam and the second laser beam can travel along the common beam path 686 from an output of the EOM system 609 to a TFP 630a, a TFP 630b, a lens 631 (e.g., a 300 mm lens), an input of the first AOM 610.

In some aspects, the first laser beam and the second laser beam can travel along the common beam path 686 from an output of the first AOM 610 to a mirror 632, a mirror 633, a lens 634 (e.g., a 600 mm lens), a mirror 635, a lens 636 (e.g., a 1,300 mm lens), a mirror 637, a TFP 638, and a first-pass input of the dual-pass amplifier 612. In some aspects, after making a first pass through the dual-pass amplifier 612, the first laser beam and the second laser beam can travel along the common beam path 686 from a first-pass output of the dual-pass amplifier 612 to a TFP 639, a lens 640 (e.g., a 950 mm lens), a mirror 641, a mirror 642, a lens 643 (e.g., a 600 mm lens), and an input of the second AOM 614.

In some aspects, the first laser beam and the second laser beam can travel from an output of the second AOM 614 to an input of the polarization rotator 615. In some instances, the polarization rotator 615 can be configured to rotate the polarization of the first laser beam, the second laser beam, or both by any suitable degree of rotation, such as 90 degrees. For example, a first polarization of the first laser beam upon entry to the input of the polarization rotator 615 can be a P polarization, and a second polarization of the first laser beam upon exit from the output of the polarization rotator 615 can be an S polarization. In another example, a third polarization of the second laser beam upon entry to the input of the polarization rotator 615 can be a P polarization, and a fourth polarization of the second laser beam upon exit from the output of the polarization rotator 615 can be an S polarization. In some aspects, the first laser beam and the second laser beam can travel along the common beam path 686 from an output of the polarization rotator 615 to a mirror 644, a mirror 645, a lens 646 (e.g., a −508 mm lens), a lens 647 (e.g., a 381 mm lens), a mirror 648, a mirror 649, a mirror 650, the TFP 639 and a second-pass input of the dual-pass amplifier 612.

In some aspects, after making a second pass through the dual-pass amplifier 612, the first laser beam and the second laser beam can travel along the common beam path 686 from a second-pass output of the dual-pass amplifier 612 to the TFP 639, a mirror 651, a mirror 652, and a mirror 653. In some aspects, after reflection from the mirror 653, the first laser beam and the second laser beam can travel along the common beam path 686 to a laser isolation system including a third AOM and a fourth AOM.

Figure 7:
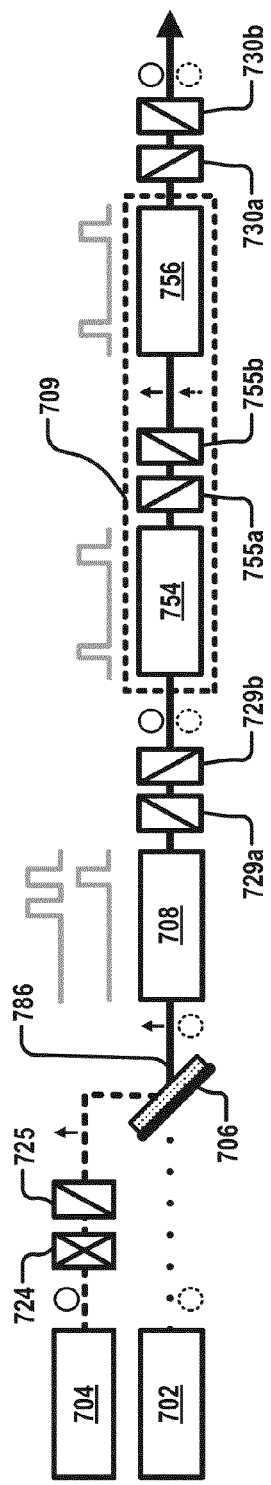
FIG. 7 is a schematic illustration of a portion of another example laser system according to some aspects of the present disclosure.

FIG. 7 is a schematic illustration of a portion of an example laser system 700 according to some aspects of the present disclosure. In some aspects, the example laser system 700 can include a first laser source 702 (e.g., a CO2 pre-pulse seed laser source), a second laser source 704 (e.g., a CO2 main pulse seed source), a beam path combiner 706 (e.g., a DBS, a TFP, a beam multiplexer, or any other suitable optical structure or combination of optical structures), a first EOM 708 (e.g., a single-crystal EOM, a single-triggered EOM), and an EOM system 709 (e.g., a double-crystal EOM, a double-triggered EOM) that includes a second EOM 754 (e.g., a single-crystal EOM, a single-triggered EOM) and a third EOM 756 (e.g., a single-crystal EOM, a single-triggered EOM). Additionally or alternatively, in some aspects, the example laser system 700 can include any of the structures, techniques, or features described with reference to the laser system 401 described with reference to FIG. 4, the example laser system 500 described with reference to FIG. 5, the example laser system 600 described with reference to FIG. 6, the example laser system 800 described with reference to FIG. 8, or any combination thereof.

In some aspects, the first laser source 702 can be configured to generate a first laser beam (e.g., a pre-pulse laser beam) that travels along a first beam path to the beam path combiner 706. In some aspects, the second laser source 704 can be configured to generate a second laser beam (e.g., a main pulse laser beam) that travels along a second beam path to a wave plate 724 (e.g., a quarter-wave plate or a half-wave plate), a TFP 725, and the beam path combiner 706. In some aspects, the beam path combiner 706 can be configured to combine the first beam path and the second beam path to generate a common beam path 786 for both the first laser beam and the second laser beam.

In some aspects, the first laser beam and the second laser beam can travel along the common beam path 786 from an output of the beam path combiner 706 to an input of the first EOM 708. In some aspects, the first laser beam and the second laser beam can travel along the common beam path 786 from an output of the first EOM 708 to a TFP 729a, a TFP 729b, and an input of the EOM system 709. In some aspects, the first laser beam and the second laser beam can travel along the common beam path 786 from an output of the EOM system 709 to a TFP 730a and a TFP 730b. In some aspects, after transmission through the TFP 730b, the first laser beam and the second laser beam can travel along the common beam path 786 to an AOM (e.g., the first AOM 510 described with reference to FIG. 5, the first AOM 610 described with reference to FIG. 6) or any other suitable component.

In one illustrative example of an example architecture for the EOM system 709, the EOM system 709 can include the second EOM 754, a TFP 755a, a TFP 755b, and the third EOM 756. In some aspects, the input of the EOM system 709 can correspond to a point along the common beam path 786 disposed after an output of the TFP 729b and before the input of the second EOM 754. In some aspects, the output of the EOM system 709 can correspond to a point along the common beam path 786 disposed after the output of the third EOM 756 and before an input of the TFP 730a. In some aspects, the first laser beam and the second laser beam can travel along the common beam path 786 through the EOM system 709 in the following segments: (i) from the input of the second EOM 709 to an input of the second EOM 754; (ii) from an output of the second EOM 754 to the TFP 755a, the TFP 755b, and an input of the third EOM 756; and (iii) from an output of the third EOM 756 to the output of the EOM system 709.

Figure 8:
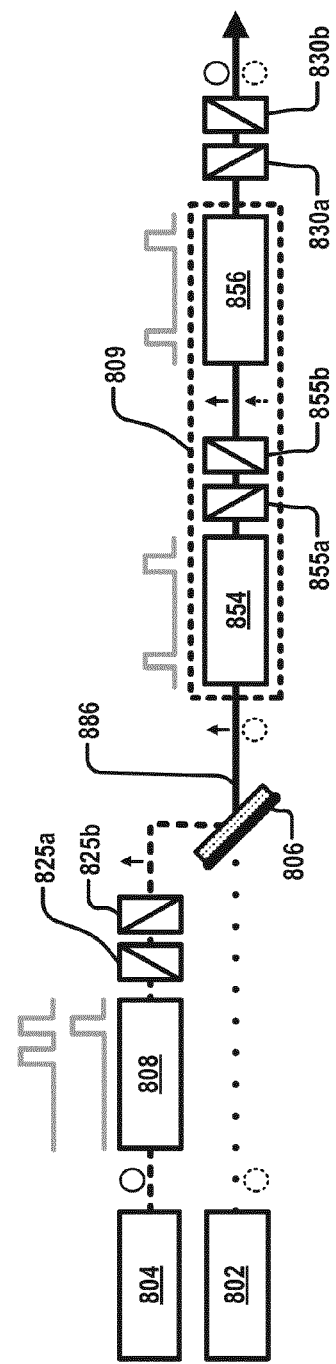
FIG. 8 is a schematic illustration of a portion of another example laser system according to some aspects of the present disclosure.

FIG. 8 is a schematic illustration of a portion of an example laser system 800 according to some aspects of the present disclosure. In some aspects, the example laser system 800 can include a first laser source 802 (e.g., a CO2 pre-pulse seed laser source), a second laser source 804 (e.g., a CO2 main pulse seed source), a first EOM 808 (e.g., a single-crystal EOM, a single-triggered EOM), a beam path combiner 806 (e.g., a DBS, a TFP, a beam multiplexer, or any other suitable optical structure or combination of optical structures), and an EOM system 809 (e.g., a double-crystal EOM, a double-triggered EOM) that includes a second EOM 854 (e.g., a single-crystal EOM, a single-triggered EOM) and a third EOM 856 (e.g., a single-crystal EOM, a single-triggered EOM). Additionally or alternatively, in some aspects, the example laser system 800 can include any of the structures, techniques, or features described with reference to the laser system 401 described with reference to FIG. 4, the example laser system 500 described with reference to FIG. 5, the example laser system 600 described with reference to FIG. 6, the example laser system 700 described with reference to FIG. 7, or any combination thereof.

In some aspects, the first laser source 802 can be configured to generate a first laser beam (e.g., a pre-pulse laser beam) that travels along a first beam path to the beam path combiner 806. In some aspects, the second laser source 804 can be configured to generate a second laser beam (e.g., a main pulse laser beam) that travels along a second beam path to the first EOM 808, a TFP 825a, a TFP 825b, and the beam path combiner 806. In some aspects, the beam path combiner 806 can be configured to combine the first beam path and the second beam path to generate a common beam path 886 for both the first laser beam and the second laser beam.

In some aspects, the first laser beam and the second laser beam can travel along the common beam path 886 from an output of the beam path combiner 806 to an input of the EOM system 809. In some aspects, the first laser beam and the second laser beam can travel along the common beam path 886 from an output of the EOM system 809 to a TFP 830a and a TFP 830b. In some aspects, after transmission through the TFP 830b, the first laser beam and the second laser beam can travel along the common beam path 886 to an AOM (e.g., the first AOM 510 described with reference to FIG. 5, the first AOM 610 described with reference to FIG. 6) or any other suitable component.

In one illustrative example of an example architecture for the EOM system 809, the EOM system 809 can include the second EOM 854, a TFP 855a, a TFP 855b, and the third EOM 856. In some aspects, the input of the EOM system 809 can correspond to a point along the common beam path 886 disposed after the output of the beam path combiner 806 and before the input of the second EOM 854. In some aspects, the output of the EOM system 809 can correspond to a point along the common beam path 886 disposed after the output of the third EOM 856 and before an input of the TFP 830a. In some aspects, the first laser beam and the second laser beam can travel along the common beam path 886 through the EOM system 809 in the following segments: (i) from the input of the EOM system 809 to an input of the second EOM 854; (ii) from an output of the second EOM 854 to the TFP 855a, the TFP 855b, and an input of the third EOM 856; and (iii) from an output of the third EOM 856 to the output of the EOM system 809.

Example Processes for Amplifying Laser Beams

Figure 9:
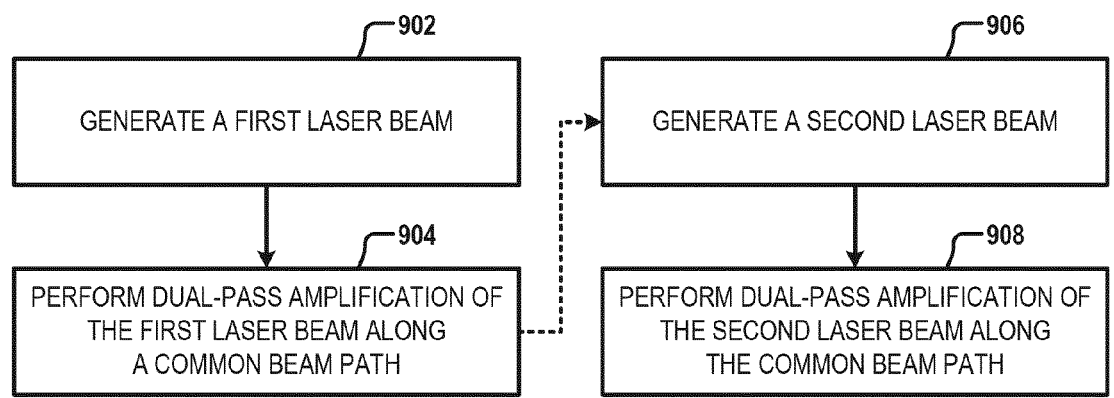
FIG. 9 is an example method for dual-pass amplification of laser beams along a common beam path according to some aspects of the present disclosure or portion(s) thereof.

FIG. 9 is an example method 900 for dual-pass amplification of laser beams along a common beam path according to some aspects of the present disclosure or portion(s) thereof. The operations described with reference to example method 900 can be performed by, or according to, any of the systems, apparatuses, components, techniques, or combinations thereof described herein, such as those described with reference to FIGS. 1-8 above and FIG. 10 below.

At operation 902, the method can include generating, by a first laser source (e.g., first laser source 502, first laser source 602, first laser source 702, first laser source 802), a first laser beam (e.g., a pre-pulse laser beam) having a first wavelength. In some aspects, the generation of the first laser beam can be accomplished using suitable mechanical or other methods and include generating the first laser beam in accordance with any aspect or combination of aspects described with reference to FIGS. 1-8 above and FIG. 10 below.

At operation 904, the method can include performing, by a dual-pass amplifier (e.g., dual-pass amplifier 512, dual-pass amplifier 612), dual-pass amplification of the first laser beam along a common beam path (e.g., common beam path 586, common beam path 686, common beam path 786, common beam path 886). In some aspects, the dual-pass amplification of the first laser beam can be accomplished using suitable mechanical or other methods and include performing the dual-pass amplification of the first laser beam in accordance with any aspect or combination of aspects described with reference to FIGS. 1-8 above and FIG. 10 below.

At operation 906, the method can include generating, by a second laser source (e.g., second laser source 504, second laser source 604, second laser source 704, second laser source 804), a second laser beam (e.g., a main pulse laser beam) having a second wavelength. In some aspects, the generation of the second laser beam can be accomplished using suitable mechanical or other methods and include generating the second laser beam in accordance with any aspect or combination of aspects described with reference to FIGS. 1-8 above and FIG. 10 below.

At operation 908, the method can include performing, by the dual-pass amplifier, dual-pass amplification of the second laser beam along the common beam path. In some aspects, the dual-pass amplification of the second laser beam can be accomplished using suitable mechanical or other methods and include performing the dual-pass amplification of the second laser beam in accordance with any aspect or combination of aspects described with reference to FIGS. 1-8 above and FIG. 10 below.

Example Computing System

Aspects of the disclosure can be implemented in hardware, firmware, software, or any combination thereof. Aspects of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others. Further, firmware, software, routines, instructions, and combinations thereof can be described herein as performing certain actions. However, it should be appreciated that such descriptions are merely for convenience and that such actions in fact result from computing devices, processors, controllers, or other devices executing the firmware, software, routines, instructions, or combinations thereof and, in doing so, causing actuators or other devices (e.g., servo motors, robotic devices) to interact with the physical world.

Figure 10:
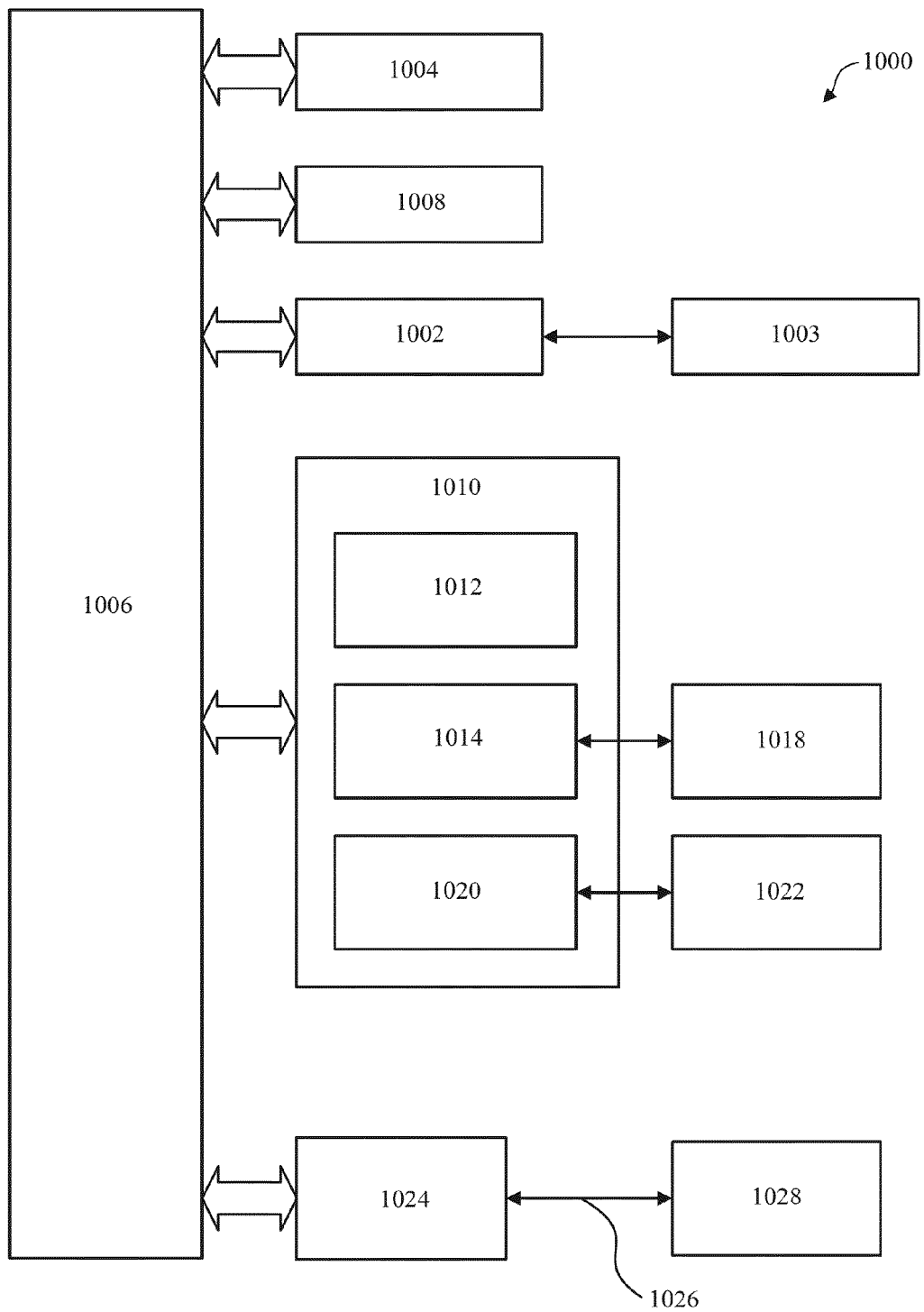
FIG. 10 is an example computer system for implementing some aspects of the present disclosure or portion(s) thereof.

Various aspects can be implemented, for example, using one or more computing systems, such as example computing system 1000 shown in FIG. 10. Example computing system 1000 can be a specialized computer capable of performing the functions described herein such as: the laser controller 411 described with reference to FIG. 4; the example laser system 500 described with reference to FIG. 5; the example laser system 600 described with reference to FIG. 6; the example laser system 700 described with reference to FIG. 7; the example laser system 800 described with reference to FIG. 8; any other suitable system, sub-system, or component; or any combination thereof. Example computing system 1000 can include one or more processors (also called central processing units, or CPUs), such as a processor 1004. Processor 1004 is connected to a communication infrastructure 1006 (e.g., a bus). Example computing system 1000 can also include user input/output device(s) 1003, such as monitors, keyboards, pointing devices, etc., that communicate with communication infrastructure 1006 through user input/output interface(s) 1002. Example computing system 1000 can also include a main memory 1008 (e.g., one or more primary storage devices), such as random access memory (RAM). Main memory 1008 can include one or more levels of cache. Main memory 1008 has stored therein control logic (e.g., computer software) and/or data.

Example computing system 1000 can also include a secondary memory 1010 (e.g., one or more secondary storage devices). Secondary memory 1010 can include, for example, a hard disk drive 1012 and/or a removable storage drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/or any other computer data storage device. Removable storage drive 1014 reads from and/or writes to removable storage unit 1018.

According to some aspects, secondary memory 1010 can include other means, instrumentalities or other approaches for allowing computer programs and/or other instructions and/or data to be accessed by example computing system 1000. Such means, instrumentalities or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Example computing system 1000 can further include a communications interface 1024 (e.g., one or more network interfaces). Communications interface 1024 enables example computing system 1000 to communicate and interact with any combination of remote devices, remote networks, remote entities, etc. (individually and collectively referred to as remote devices 1028). For example, communications interface 1024 can allow example computing system 1000 to communicate with remote devices 1028 over communications path 1026, which can be wired and/or wireless, and which can include any combination of LANs, WANs, the Internet, etc. Control logic, data, or both can be transmitted to and from example computing system 1000 via communications path 1026.

The operations in the preceding aspects of the present disclosure can be implemented in a wide variety of configurations and architectures. Therefore, some or all of the operations in the preceding aspects can be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, example computing system 1000, main memory 1008, secondary memory 1010 and removable storage units 1018 and 1022, as well as tangible articles of manufacture embodying any combination of the foregoing. Such control logic, when executed by one or more data processing devices (such as example computing system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects of the disclosure can operate with software, hardware, and/or operating system implementations other than those described herein.

Although specific reference may be made in this text to the use of lithographic apparatus in the manufacture of ICs, it should be understood that the lithographic apparatuses described herein can have other applications, such as the manufacture of integrated optical systems, guidance and detection patterns for magnetic domain memories, flat-panel displays, LCDs, thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein can be processed, before or after exposure, in for example a track unit (a tool that typically applies a layer of resist to a substrate and develops the exposed resist), a metrology unit and/or an inspection unit. Where applicable, the disclosure herein can be applied to such and other substrate processing tools. Further, the substrate can be processed more than once, for example in order to create a multi-layer IC, so that the term substrate used herein may also refer to a substrate that already contains multiple processed layers.

It is to be understood that the phraseology or terminology herein is for the purpose of description and not of limitation, such that the terminology or phraseology of the present specification is to be interpreted by those skilled in relevant art(s) in light of the teachings herein.

The term "substrate" as used herein describes a material onto which material layers are added. In some aspects, the substrate itself can be patterned and materials added on top of it can also be patterned, or can remain without patterning.

The examples disclosed herein are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

While specific aspects of the disclosure have been described above, it will be appreciated that the aspects can be practiced otherwise than as described. The description is not intended to limit the embodiments of the disclosure.

It is to be appreciated that the Detailed Description section, and not the Background, Summary, and Abstract sections, is intended to be used to interpret the claims. The Summary and Abstract sections may set forth one or more but not all example embodiments as contemplated by the inventor(s), and thus, are not intended to limit the present embodiments and the appended claims in any way.

Some aspects of the disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects of the disclosure will so fully reveal the general nature of the aspects that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein.

Other aspects of the invention are set out in the following numbered clauses.

1. A radiation source, comprising:
a laser system comprising:
a first laser source configured to generate a first laser beam;
a second laser source configured to generate a second laser beam; and
a dual-pass amplifier configured to:
perform dual-pass amplification of the first laser beam along a common beam path; and
perform dual-pass amplification of the second laser beam along the common beam path.

2. The radiation source of clause 1, wherein the first laser beam comprises a pre-pulse laser beam.

3. The radiation source of clause 2, wherein the second laser beam comprises a main pulse laser beam.

4. The radiation source of clause 3, wherein the laser system is configured to:
hit a fuel target with the pre-pulse laser beam to generate a modified fuel target; and
hit the modified fuel target with the main pulse laser beam to generate a plasma at a plasma formation region.

5. The radiation source of clause 1, wherein:
the laser system further comprises an electro-optic modulator disposed between the second laser source and the dual-pass amplifier; and
the electro-optic modulator is configured to:
output the first laser beam along the common beam path; and output the second laser beam along the common beam path.

6. The radiation source of clause 5, wherein the electro-optic modulator comprises:
a first single-crystal electro-optic modulator;
a second single-crystal electro-optic modulator; and
a third single-crystal electro-optic modulator.

7. The radiation source of clause 5, wherein the electro-optic modulator comprises:
a single-crystal electro-optic modulator; and
a double-crystal electro-optic modulator.

8. The radiation source of clause 5, wherein the electro-optic modulator comprises a triple-crystal electro-optic modulator.

9. The radiation source of clause 5, wherein:
the laser system further comprises an acousto-optic modulator disposed along the common beam path between the electro-optic modulator and the dual-pass amplifier; and
the acousto-optic modulator is configured to:
receive the first laser beam from the electro-optic modulator along the common beam path;
receive the second laser beam from the electro-optic modulator along the common beam path;
output the first laser beam to the dual-pass amplifier along the common beam path; and
output the second laser beam to the dual-pass amplifier along the common beam path.

10. The radiation source of clause 9, wherein:
the acousto-optic modulator is further configured to:
output the first laser beam at a first diffraction angle; and
output the second laser beam at a second diffraction angle; and
the second diffraction angle is about equal to the first diffraction angle.

11. The radiation source of clause 1, wherein:
the first laser beam comprises a first wavelength; and
the second laser beam comprises a second wavelength different from the first wavelength.

12. The radiation source of clause 1, wherein:
the laser system further comprises an acousto-optic modulator disposed along the common beam path; and the acousto-optic modulator is configured to:
receive the first laser beam from the dual-pass amplifier along the common beam path;
receive the second laser beam from the dual-pass amplifier along the common beam path;
generate a modified first laser beam based on a first wavelength of the first laser beam;
generate a modified second laser beam based on a second wavelength of the second laser beam;
output the modified first laser beam to the dual-pass amplifier along the common beam path; and
output the modified second laser beam to the dual-pass amplifier along the common beam path.

13. The radiation source of clause 12, wherein:
the acousto-optic modulator is further configured to:
generate, based on a first radio frequency of a first radio wave, a first acoustic grating configured to diffract the first laser beam;
generate, based on a second radio frequency of a second radio wave, a second acoustic grating configured to diffract the second laser beam;
output, based on the first acoustic grating, the first laser beam at a first diffraction angle; and
output, based on the second acoustic grating, the second laser beam at a second diffraction angle;
a first mathematical product of the first wavelength and the first radio frequency is about equal to a second mathematical product of the second wavelength and the second radio frequency; and
the second diffraction angle is about equal to the first diffraction angle.

14. The radiation source of clause 12, wherein the dual-pass amplifier is further configured to:
perform the dual-pass amplification of the first laser beam based on:
a first amplification of the first laser beam; and
a second amplification of the modified first laser beam; and
perform the dual-pass amplification of the second laser beam based on:
a third amplification of the second laser beam; and
a fourth amplification of the modified second laser beam.

15. The radiation source of clause 1, wherein:
the laser system further comprises a laser isolation system disposed downstream of
the dual-pass amplifier along the common beam path; and
the laser isolation system is configured to:
receive a dual-pass amplified first laser beam from the dual-pass amplifier along the common beam path;
receive a dual-pass amplified second laser beam from the dual-pass amplifier along the common beam path;
generate an isolated first laser beam based on the dual-pass amplified first laser beam; and
generate an isolated second laser beam based on the dual-pass amplified second laser beam.

16. The radiation source of clause 15, wherein:
the isolated first laser beam comprises a first isolation factor of greater than 10,000 times; and
the isolated second laser beam comprises a second isolation factor of greater than 10,000 times.

17. The radiation source of clause 15, wherein the laser isolation system comprises an acousto-optic modulator disposed downstream of the dual-pass amplifier along the common beam path.

18. The radiation source of clause 1, wherein:
the first laser beam comprises a first wavelength; and
the second laser beam comprises a second wavelength greater than about the first wavelength.

19. An apparatus, comprising:
a first laser source configured to generate a first laser beam;
a second laser source configured to generate a second laser beam; and
a dual-pass amplifier configured to:
perform dual-pass amplification of the first laser beam along a common beam path; and
perform dual-pass amplification of the second laser beam along the common beam path.

20. A method, comprising:
generating, by a first laser source, a first laser beam;
generating, by a second laser source, a second laser beam;
performing, by a dual-pass amplifier, dual-pass amplification of the first laser beam along a common beam path; and
performing, by the dual-pass amplifier, dual-pass amplification of the second laser beam along the common beam path.

The breadth and scope of the present disclosure should not be limited by any of the above-described example aspects or embodiments, but should be defined only in accordance with the following claims and their equivalents.

The invention claimed is:

1. A radiation source, comprising:
a laser system comprising:
    a first laser source configured to generate a first laser beam;
    a second laser source configured to generate a second laser beam;
    a dual-pass amplifier configured to:
        perform dual-pass amplification of the first laser beam along a common beam path; and
        perform dual-pass amplification of the second laser beam along the common beam path; and
    an acousto-optic modulator disposed along the common beam path, the acousto-optic modulator being configured to:
        receive the first laser beam from the dual-pass amplifier along the common beam path;
        receive the second laser beam from the dual-pass amplifier along the common beam path;
        generate a modified first laser beam based on a first wavelength of the first laser beam;
        generate a modified second laser beam based on a second wavelength of the second laser beam;
        output the modified first laser beam to the dual-pass amplifier along the common beam path; and
        output the modified second laser beam to the dual-pass amplifier along the common beam path,
    the dual-pass amplifier being further configured to:
        perform the dual-pass amplification of the first laser beam based on:
            a first amplification of the first laser beam; and
            a second amplification of the modified first laser beam; and
        perform the dual-pass amplification of the second laser beam based on:
            a third amplification of the second laser beam; and
            a fourth amplification of the modified second laser beam.

2. The radiation source of claim 1, wherein the first laser beam comprises a pre-pulse laser beam.

3. The radiation source of claim 2, wherein the second laser beam comprises a main pulse laser beam.

4. The radiation source of claim 3, wherein the laser system is configured to:
hit a fuel target with the pre-pulse laser beam to generate a modified fuel target; and
hit the modified fuel target with the main pulse laser beam to generate a plasma at a plasma formation region.

5. The radiation source of claim 1, wherein:
the laser system further comprises an electro-optic modulator disposed between the second laser source and the dual-pass amplifier; and
the electro-optic modulator is configured to:
output the first laser beam along the common beam path; and
output the second laser beam along the common beam path.

6. The radiation source of claim 5, wherein the electro-optic modulator comprises:
a first single-crystal electro-optic modulator;
a second single-crystal electro-optic modulator; and
a third single-crystal electro-optic modulator.

7. The radiation source of claim 5, wherein the electro-optic modulator comprises:
a single-crystal electro-optic modulator; and
a double-crystal electro-optic modulator.

8. The radiation source of claim 5, wherein the electro-optic modulator comprises a triple-crystal electro-optic modulator.

9. The radiation source of claim 5, wherein:
the laser system further comprises an acousto-optic modulator disposed along the common beam path between the electro-optic modulator and the dual-pass amplifier; and
the acousto-optic modulator is configured to:
receive the first laser beam from the electro-optic modulator along the common beam path;
receive the second laser beam from the electro-optic modulator along the common beam path;
output the first laser beam to the dual-pass amplifier along the common beam path; and
output the second laser beam to the dual-pass amplifier along the common beam path.

10. The radiation source of claim 9, wherein:
the acousto-optic modulator is further configured to:
output the first laser beam at a first diffraction angle; and
output the second laser beam at a second diffraction angle; and
the second diffraction angle is about equal to the first diffraction angle.

11. The radiation source of claim 1, wherein:
the first laser beam comprises a first wavelength; and
the second laser beam comprises a second wavelength different from the first wavelength.

12. The radiation source of claim 1, wherein:
the acousto-optic modulator is further configured to:
generate, based on a first radio frequency of a first radio wave, a first acoustic grating configured to diffract the first laser beam;
generate, based on a second radio frequency of a second radio wave, a second acoustic grating configured to diffract the second laser beam;
output, based on the first acoustic grating, the first laser beam at a first diffraction angle; and
output, based on the second acoustic grating, the second laser beam at a second diffraction angle;
a first mathematical product of the first wavelength and the first radio frequency is about equal to a second mathematical product of the second wavelength and the second radio frequency; and
the second diffraction angle is about equal to the first diffraction angle.

13. The radiation source of claim 1, wherein:
the laser system further comprises a laser isolation system disposed downstream of the dual-pass amplifier along the common beam path; and
the laser isolation system is configured to:
receive a dual-pass amplified first laser beam from the dual-pass amplifier along the common beam path;
receive a dual-pass amplified second laser beam from the dual-pass amplifier along the common beam path;
generate an isolated first laser beam based on the dual-pass amplified first laser beam; and
generate an isolated second laser beam based on the dual-pass amplified second laser beam.

14. The radiation source of claim 13, wherein:
the isolated first laser beam comprises a first isolation factor of greater than 10,000 times; and
the isolated second laser beam comprises a second isolation factor of greater than 10,000 times.

15. The radiation source of claim 13, wherein the laser isolation system comprises an acousto-optic modulator disposed downstream of the dual-pass amplifier along the common beam path.

16. The radiation source of claim 1, wherein:
the first laser beam comprises a first wavelength; and
the second laser beam comprises a second wavelength greater than about the first wavelength.

17. An apparatus, comprising:
a first laser source configured to generate a first laser beam;
a second laser source configured to generate a second laser beam;
a dual-pass amplifier configured to:
perform dual-pass amplification of the first laser beam along a common beam path; and
perform dual-pass amplification of the second laser beam along the common beam path; and
an acousto-optic modulator disposed along the common beam path, the acousto-optic modulator being configured to:
receive the first laser beam from the dual-pass amplifier along the common beam path;
receive the second laser beam from the dual-pass amplifier along the common beam path;
generate a modified first laser beam based on a first wavelength of the first laser beam;
generate a modified second laser beam based on a second wavelength of the second laser beam;
output the modified first laser beam to the dual-pass amplifier along the common beam path; and
output the modified second laser beam to the dual-pass amplifier along the common beam path,
the dual-pass amplifier being further configured to:
perform the dual-pass amplification of the first laser beam based on:
a first amplification of the first laser beam; and
a second amplification of the modified first laser beam; and
perform the dual-pass amplification of the second laser beam based on:

a third amplification of the second laser beam; and
a fourth amplification of the modified second laser beam.

18. A method, comprising:
generating, by a first laser source, a first laser beam;
generating, by a second laser source, a second laser beam;
performing, by a dual-pass amplifier, dual-pass amplification of the first laser beam along a common beam path;
performing, by the dual-pass amplifier, dual-pass amplification of the second laser beam along the common beam path;
performing, by an acousto-optic modulator disposed along the common beam path, generating a modified first laser beam based on a first wavelength of the first laser beam;
performing, by the acoustic modulator, generating a modified second laser beam based on a second wavelength of the second laser beam;
performing, by the dual-pass amplifier, the dual-pass amplification of the first laser beam based on:
a first amplification of the first laser beam; and
a second amplification of the modified first laser beam; and
perform, by the dual-pass amplifier, the dual-pass amplification of the second laser beam based on:
a third amplification of the second laser beam; and
a fourth amplification of the modified second laser beam.

* * * * *